United States Patent
Lee et al.

(10) Patent No.: US 9,735,825 B2
(45) Date of Patent: Aug. 15, 2017

(54) ELECTRONIC DEVICE AND METHOD FOR CONTROLLING DISPLAY ON BASIS OF INFORMATION OF ACCESSORY DEVICE AND ACCESSORY DEVICE RELATED THERETO

(71) Applicant: Samsung Electronics Co., Ltd., Suwon-si, Gyeonggi-do (KR)

(72) Inventors: Seung-Hwan Lee, Hwaseong-si (KR); Ji-Yong Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/912,778

(22) PCT Filed: Aug. 19, 2014

(86) PCT No.: PCT/KR2014/007671
§ 371 (c)(1),
(2) Date: Feb. 18, 2016

(87) PCT Pub. No.: WO2015/026131
PCT Pub. Date: Feb. 26, 2015

(65) Prior Publication Data
US 2016/0197637 A1  Jul. 7, 2016

(30) Foreign Application Priority Data

Aug. 19, 2013 (KR) .................. 10-2013-0097762
Aug. 7, 2014  (KR) .................. 10-2014-0101421

(51) Int. Cl.
*H04M 1/725*  (2006.01)
*H04B 1/3888*  (2015.01)
(Continued)

(52) U.S. Cl.
CPC ............ *H04B 1/3888* (2013.01); *A45C 11/00* (2013.01); *G06F 3/048* (2013.01); *G06F 3/14* (2013.01);
(Continued)

(58) Field of Classification Search
CPC ........... G06F 2200/1633; G06F 1/1628; G06F 2200/1637
(Continued)

(56) References Cited

U.S. PATENT DOCUMENTS 8,138,869 B1    3/2012 Lauder et al.
2004/0203499 A1  10/2004 Kostiainen et al.
(Continued)

FOREIGN PATENT DOCUMENTS

CN       1640106 A    7/2005
CN     202998219 A    6/2013
(Continued)

*Primary Examiner* — Keith Ferguson
(74) *Attorney, Agent, or Firm* — Jefferson IP Law, LLP

(57) ABSTRACT

Various embodiments of the present disclosure provide an accessory device of a portable electronic device. The accessory device includes a first cover that is detachably attached to at least a portion of the electronic device, a second cover that is connected to the first cover, at least a portion of the second cover covering at least a portion of a display of the electronic device, and an electronic circuit that is arranged inside the first cover or the second cover. The electronic circuit may include a memory that stores at least some of codes or data that indicate one or more of identification information, a characteristic, a configuration, a structure, and a function that are associated with a protection cover. Various pieces of corresponding information may be output according to the kinds of applied accessories. Therefore, the consumers' product preference can be improved and the reliability of the electronic device can be secured.

12 Claims, 20 Drawing Sheets

(51) Int. Cl.
*A45C 11/00* (2006.01)
*G06F 3/14* (2006.01)
*G06F 3/048* (2013.01)
*H04M 1/02* (2006.01)
*H04M 1/04* (2006.01)

(52) U.S. Cl.
CPC ..... *H04M 1/0202* (2013.01); *H04M 1/72527* (2013.01); *A45C 2011/002* (2013.01); *G06F 2200/1634* (2013.01); *H04M 1/0214* (2013.01); *H04M 1/04* (2013.01)

(58) Field of Classification Search
USPC .. 455/566, 575.8, 575.3, 575.1, 550.1, 90.3, 455/41.1–41.3, 73, 422.1, 403; 379/441, 379/443, 447, 451
See application file for complete search history.

(56) References Cited

U.S. PATENT DOCUMENTS

| | | |
|---|---|---|
| 2005/0090280 A1 | 4/2005 | Nielsen |
| 2005/0286212 A1 | 12/2005 | Brignone et al. |
| 2008/0096620 A1* | 4/2008 | Lee ................... G06F 1/1626 455/575.8 |
| 2012/0052929 A1 | 3/2012 | Thammasouk et al. |
| 2013/0242505 A1* | 9/2013 | Nguyen ............... G06F 1/1626 361/679.55 |
| 2014/0025537 A1* | 1/2014 | Venkataramu ..... G06Q 30/0621 705/26.61 |
| 2014/0055928 A1 | 2/2014 | Lee |
| 2014/0128131 A1* | 5/2014 | Sin ....................... H04M 1/185 455/575.8 |
| 2014/0159839 A1 | 6/2014 | Kim |
| 2014/0285033 A1* | 9/2014 | Jantunen ............. H04B 5/0031 307/149 |
| 2014/0333431 A1* | 11/2014 | Abdelsamie ........ H04M 1/0283 340/539.11 |

FOREIGN PATENT DOCUMENTS

| | | |
|---|---|---|
| EP | 2 059 005 A2 | 5/2009 |
| EP | 2 187 601 A1 | 5/2010 |
| EP | 2 511 790 A2 | 10/2012 |
| JP | 2008005301 A | 1/2008 |
| KR | 10-2004-0086451 A | 10/2004 |
| KR | 10-2008-0047938 A | 5/2008 |
| KR | 10-2010-0130345 A | 12/2010 |
| KR | 10-2011-0025939 A | 3/2011 |
| KR | 10-2013-0018393 A | 2/2013 |
| KR | 10-2013-0067720 A | 6/2013 |
| KR | 10-2014-0027842 A | 3/2014 |
| WO | 2005/104655 A2 | 11/2005 |
| WO | 2012/036710 A1 | 3/2012 |

* cited by examiner

ELECTRONIC DEVICE AND METHOD FOR CONTROLLING DISPLAY ON BASIS OF INFORMATION OF ACCESSORY DEVICE AND ACCESSORY DEVICE RELATED THERETO

TECHNICAL FIELD

The present disclosure relates to an electronic device. For example, the present disclosure relates to an electronic device and a method for controlling a display based on accessory device information. Further, the present disclosure relates to an accessory device associated with the electronic device and the method.

BACKGROUND ART

Recently, consumers who purchase an expensive electronic device may use an accessory that is installed to be interlocked with the electronic device in order to use various additional functions as well as to make the exterior of the electronic device beautiful. Examples of such accessories include a dongle that is used by being electrically connected to an interface connector of an electronic device, a dock device that is used by selectively attaching/detaching an electronic device to/from the dock device, and an accessory device that is installed to enclose at least a portion of an electronic device.

The above-mentioned accessories are being designed to sufficiently express the personalities of the users of the electronic devices, and the electronic devices may have various functions to be interlocked with such electronic devices.

DETAILED DESCRIPTION OF THE INVENTION

Technical Problem

An accessory is electrically connected to an electronic device through a USB port or an interface connector, and may recognize only a limited number of USB IDs or ADC values. Thus, in practice, an electronic device may not easily discriminate the kind of accessory that is applied thereto, and the functions to be interlocked with the accessory using the USB IDs or the ADC values are insufficient.

An accessory device, which is applied in order to protect at least a portion of an electronic device, may selectively output data on a display region of the electronic device that corresponds to a window region that is included in a cover, depending on the opening/closing of the accessory device. However, the kind of applied accessory device cannot be discriminated and various functions suitable for the kind of the applied accessory cannot be exhibited.

Various embodiments of the present disclosure may provide a method for controlling an output depending on an accessory, and an electronic device for the method.

Technical Solution

According to various embodiments, there may be provided an accessory device for a portable electronic device. The accessory device includes: a first cover that is detachably attached to at least a portion of the electronic device; a second cover that is connected to the first cover, at least a portion of the second cover covering at least a portion of a display of the electronic device; and an electronic circuit that is arranged inside the first cover or the second cover. The electronic circuit may include a memory that stores at least some codes or data that indicate one or more of identification information, a characteristic, a configuration, a structure, and a function that are associated with a protection cover.

According to various embodiments, there may be provided a portable electronic device. The electronic device includes: a main body; a display that is exposed through one face of the main body; at least one sensor that detects whether a portion of an accessory device, which is detachably attached to at least a portion of the main body, is adjacent to at least a portion of the display; and a processor that is included inside the main body, and is electrically connected to the display and the sensor. The processor receives data and/or codes from an electronic circuit that is embedded in the accessory device, and controls at least one of a screen that is displayed on the display and a function of the electronic device, at least partially based on the received data and/or codes.

According to various embodiments, there may be provided a method of operating a portable electronic device that includes an accessory device installed to cover at least a portion of a display. The method includes: an operation of detecting whether a portion of the accessory device is adjacent to at least a portion of the display; an operation of receiving data and/or codes from an electronic circuit that is embedded in the accessory device; and an operation of controlling at least one of a screen that is displayed on the display and a function of the portable electronic device, at least partially based on the received data and/or codes.

According to various embodiments, there may be provided a portable electronic device. The electronic device includes: a main body; a display that is exposed through one face of the main body; an accessory device that is detachably attached to at least a portion of the main body, at least a portion of the accessory device being arranged to be selectively adjacent to at least a portion of the display; and at least one sensor that detects whether a portion of the accessory device is adjacent to at least a portion of the display; a processor that is included inside the main body, and is electrically connected to the display and the sensor. The processor receives data and/or codes from an electronic circuit that is embedded in the accessory device, and controls at least one of a screen that is displayed on the display and a function of the electronic device, at least partially based on the received data and/or codes.

Advantageous Effects

According to various embodiments of the present disclosure, an electronic device may output various pieces of information according to the kinds of accessories to be applied thereto. Therefore, the consumers' product preference can be improved and the reliability of the electronic device can be secured.

Various embodiments of the present disclosure may provide a method that is capable of discriminating various kinds of accessories based on unique information that is assigned to each of the accessories, and an electronic device for the method.

Various embodiments of the present disclosure may provide a method of controlling an output depending on an accessory that is capable of outputting corresponding information depending on the kind of applied accessory, and an electronic device for the method.

Various embodiments of the present disclosure may provide a method of controlling an output depending on an accessory in order to prevent, in advance, the use of an illegally copied accessory or the like, and an electronic device for the method.

Various embodiments of the present invention may provide a method of controlling an output depending on an accessory, in which the method is implemented to be capable of contributing to securing the reliability of an electronic device by providing various pieces of information according to the kind of the accessory, and an electronic device for the method.

MODE FOR CARRYING OUT THE INVENTION

Figure 1:
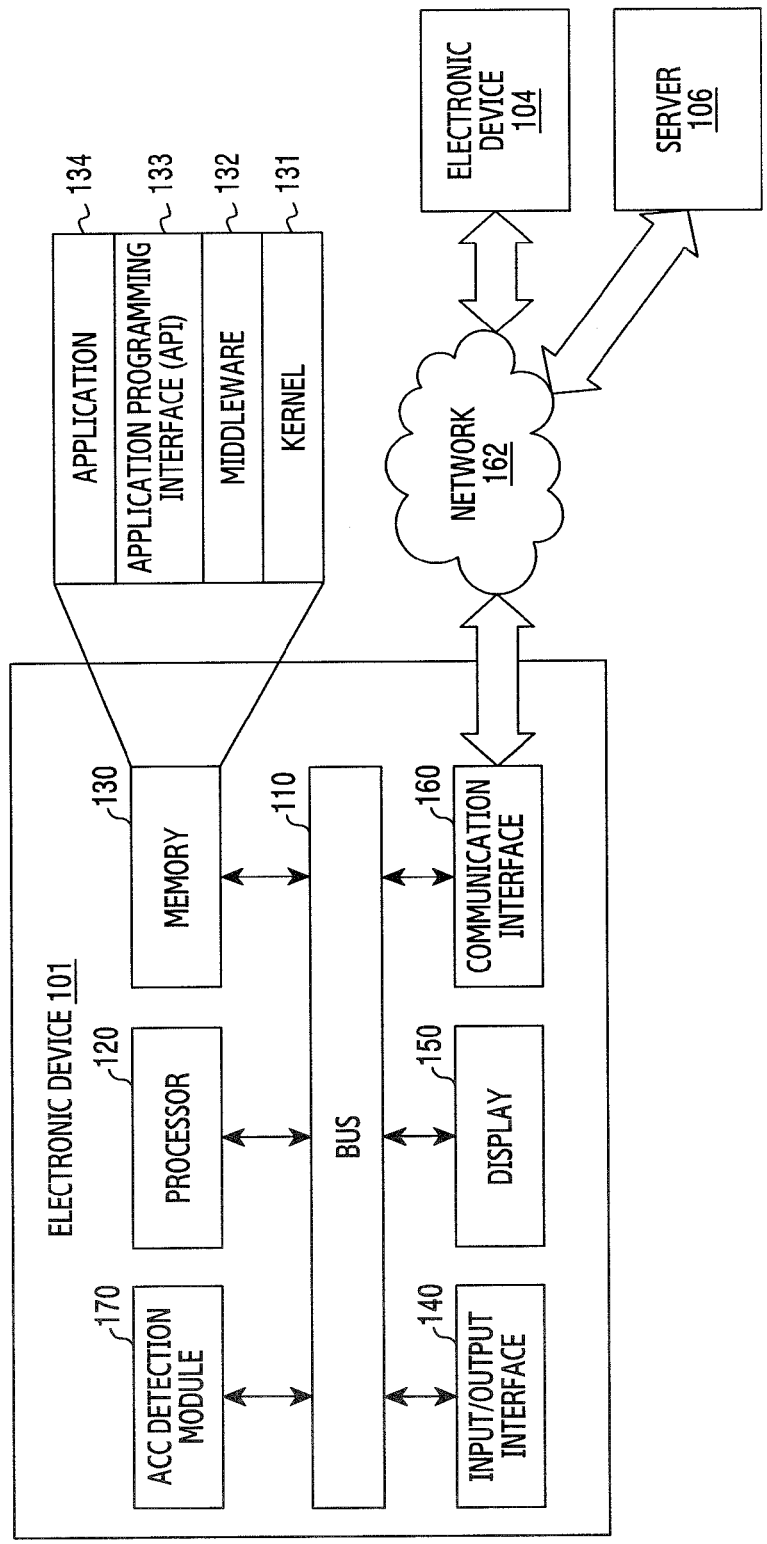
FIG. 1 is a view illustrating a network environment that includes an electronic device according to various embodiments of the present disclosure.

Hereinafter, various embodiments of the present disclosure will be described with reference to the accompanying drawings. The present disclosure may be modified in various forms and include various embodiments, but specific examples are illustrated in the drawings and described in the description. However, the description is not intended to limit the present disclosure to the specific embodiments, and it shall be appreciated that all the changes, equivalents and substitutions belonging to the idea and technical scope of the present disclosure are included in the present disclosure. In the description of the drawings, identical or similar reference numerals are used to designate identical or similar elements.

The term "include" or "may include" refers to the existence of a corresponding disclosed function, operation or component which can be used in various embodiments of the present disclosure and does not limit one or more additional functions, operations, or components. In the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

The expressions such as "first", "second", or the like used in various embodiments of the present disclosure may modify various component elements in the various embodiments but may not limit corresponding component elements. For example, the above expressions do not limit the sequence and/or importance of the elements. The expressions may be used to distinguish a component element from another component element. For example, a first user device and a second user device indicate different user devices although both of them are user devices. For example, a first element may be termed a second element, and similarly, a second element may be termed a first element without departing from the scope of the present disclosure.

When it is described that a certain structural element "is connected to" or "is in contact with" another structural element, it should be understood that although the certain structural element is directly connected to or is in direct contact with another structural element, still another structural element may be interposed therebetween. Conversely, when one component element is "directly coupled" or "directly connected" to another component element, it may be construed that a third component element does not exist between the first component element and the second component element.

The terms in various embodiments of the present disclosure are used to describe a specific embodiment, and are not intended to limit the present disclosure. As used herein, singular forms may include plural forms as well unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device including an accessory detection function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch.

According to some embodiments, the electronic device may be a smart home appliance with a camera function. The smart home appliances may include at least one of for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical devices such as a magnetic resonance angiography (MRA) scanner, a magnetic resonance imaging (MRI) scanner, a computed tomography (CT) scanner, a scanner, an ultrasonograph, or the like, a navigation device, a Global Positioning System (GPS) receiver, an Event Data Recoder (EDR), a Flight Data Recoder (FDR), a vehicle infotainment device, an electronic equipment for ship (for example a ship navigation device and gyro-compass and the like, avionics, a security device, a head unit for vehicle, an industrial or household robot, ATM (automatic teller machine) in banking facilities or POS (point of sales) in stores.

According to some embodiments, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function. An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

Hereinafter, an electronic device according to various embodiments will be described with reference to the accompanying drawings. The term "user" used in various embodiments may refer to a person who uses an electronic device or a device (for example, an artificial intelligence electronic device) that uses an electronic device.

According to various embodiments of the present disclosure, an electronic device may sense the opening/closing of a protection cover of an accessory device. For example, the magnetic force of a magnet, which is provided in the protection cover of the accessory device, can be sensed by a hall sensor that is installed at a corresponding position of the electronic device. Without being limited thereto, however, the closing of the protection cover can be sensed by a proximity sensor that is installed on the front face of the electronic device. Further, the closing of the protection cover can be sensed by an image sensor that is installed in the electronic device. In order to sense any other sensing target means that is provided on the protection cover, a sensing means may be arranged at a corresponding position of the electronic device.

According to various embodiments of the present disclosure, the electronic device may perform a control such that status information of an electronic device is displayed only on a display region that corresponds to a transparent window of the protection cover in a state where the protection cover of the accessory device is closed. For example, the status information may include one or more pieces of basic information, such as battery residual capacity information of the electronic device, weather information, and time information.

FIG. 1 is a view illustrating a network environment 100 that includes an electronic device 101 according to various embodiments of the present disclosure.

Referring to FIG. 1, the electronic device 101 may include a bus 110, a processor 120, a memory 130, an input/output interface 140, a display 150, a communication interface 160, and an ACC detection module 170.

The bus 110 may be a circuit that connects the above-mentioned components and transmits communication (a control message) between the components.

The processor 120 may receive commands from the other above-mentioned components (e.g., the memory 130, the input/output interface 140, the display 150, the communication interface 160, and the ACC detection module 170) through, for example, the bus 110. The processor 120 may decode the received commands, and may execute an arithmetic operation or data processing based on the decoded commands.

The memory 130 may store commands or data that are received from the processor 120 or the other components (e.g., the input/output interface 140, the display 150, the communication interface 160, and the ACC detection module 170), or are produced by the processor 120 or the other components. The program 130 may include, for example, programming modules, such as a kernel 131, a middleware 132, an Application Programming Interface (API) 133, and an application 134. Each of the above-mentioned programming modules may be configured by software, firmware, hardware, or a combination of two or more thereof.

The kernel 131 may control or manage system resources (e.g., the bus 110, the processor 120, or the memory 130) that are used for executing operations or functions that are implemented in the other programming modules (e.g., the middleware 132, the API 133, or the application program 134). In addition, the kernel 131 may provide an interface that may access individual components of the electronic device 101 from the middleware 132, the API 133, or the application 134 so as to control or manage the individual components.

The middleware 132 may play an intermediary role such that the API 133 or the application 134 may communicate with the kernel 131 so as to exchange data. In addition, in connection with one or more task requests received from one or more applications 134, the middleware 132 may perform a control for the task requests (e.g., scheduling or load balancing) by using, for example, a method of assigning the priority to be capable of using the system resources of the electronic device 101 (e.g., the bus 110, the processor 120, or the memory 130) to at least one of the applications 134.

The API 133 is an interface that allows the applications 134 to control functions provided from the kernel 131 or the middleware 132, and may include, for example, one or more interfaces or functions (e.g., commands) for a file control, a window control, an image processing, or a character control.

According to various embodiments, the applications 134 may include an SMS/MMS application, an e-mail application, a calendar application, an alarm application, a healthcare application (e.g., an application that measures a work rate, a blood sugar, or the like), an environment information application (e.g., an application that provides, e.g., atmospheric pressure, humidity, or temperature information), or the like. In addition or alternatively, the applications 134 may include an application related to information exchanged between the electronic device 101 and an external electronic device (e.g., the electronic device 104). The application related to information exchange may include, for example, a notification relay application to transmit specific information to the external electronic device, or a device management application to manage the external electronic device.

For example, the notification relay application may include a function of relaying notification information produced from any other application of the electronic device 101 (e.g., the SMS/MMS application, the e-mail application, the healthcare application, or the environment information application) to the external electronic devices (e.g., the electronic devices 104). In addition or alternatively, the notification relay application may receive notification information from, for example, an external electronic device (e.g., the electronic device 104), and may provide the notification information to the user. The device management application may manage (e.g., install, delete, or update) one or more functions of an external electronic device (e.g., the electronic device 104) that communicates with the electronic device 101 (e.g., turn-on/turn-off of the external electronic device itself (or some components thereof) or adjustment of brightness (or resolution) of a display, an application that is operated in the external electronic device, or a service that is provided by the external electronic device (e.g., a telephony service or a message service).

According to various embodiments, the applications 134 may include an application that is designated according to an attribute (the kind of electronic device) of the external electronic device (e.g., the electronic device 104). For example, in the case where the external electronic device is an MP3 player, the applications 134 may include an application related to music reproduction. Likewise, in the case where the external electronic device is a mobile medical device, the applications 134 may include an application related to healthcare. According to one embodiment, the applications 134 may include at least one of an application that is designated to the electronic device 101 and an application that is received from an external electronic device (the server 106 or the electronic device 104).

The input/output interface 140 may transmit commands or data that are input by a user through an input/output device (e.g., a sensor, a keyboard, or a touch screen) to the processor 120, the memory 130, or the communication interface 160 through, for example, the bus 110. For example, the input/output interface 140 may provide data to the processor 120 in relation to a user's touch that is input through a touch screen. In addition, the input/output interface 140 may output commands or data, which have been received from the processor 120, the memory 130, or the communication interface 160 through, for example, the bus 110, through the input/output interface (e.g., a speaker or a display). For example, the input/output interface 140 may output voice data, which have been processed through the processor 120, to the user through a speaker.

The display 150 may indicate various pieces of information (e.g., multimedia data or text data) to the user.

The communication interface 160 may connect communication between the electronic device 101 and an external device (e.g., the electronic device 104 or the server 106). For example, the communication interface 160 may be connected to a network 162 through wireless communication or wired communication so as to communicate with the external device. The wireless communication may include at least one of, for example, Wireless Fidelity (WiFi), Bluetooth (BT), Near Field Communication (NFC), Global Positioning System (GPS), and cellular communication (e.g., LTE, LTE-A, CDMA, WCDMA, UMTS, WiBro, or GSM). The wired communication may include at least one of, for example, Universal Serial Bus (USB), High Definition Multimedia Interface (HDMI), Recommended Standard 232 (RS-232), and Plain Old Telephone Service (POTS).

According to one embodiment, the network 162 may be a communication network. The communication network may include at least one of a computer network, internet, internet of things, and a telephone network. According to one embodiment, a protocol for communication between the electronic device 101 and an external device (e.g., a transport layer protocol, a data link layer protocol, or a physical layer protocol) may be supported by the applications 134, the application programming interface 133, the middleware 132, the kernel 131, and the communication interface 160.

The ACC detection module 170 may determine an electric connection of an ID chip module via the input/output interface 140, and may read unique status information of an accessory that is stored in an ID chip of the ID chip module. According to one embodiment, the ACC detection module 170 may perform a control such that various pieces of information may be output by the processor based on the read unique status information of the ID chip. Such information may be output using at least one of visual output through a display, acoustic output through a speaker, and tactile output through a vibrator.

In describing various embodiments of the present disclosure, the electronic device will be described with reference to a touch screen that allows an input process through an input device and a display process through a display unit to be performed on a single physical screen. The term "display unit" may be interchangeably used with the term "display." Accordingly, even if a display unit and an input device are separately illustrated in a device configuration of various embodiments of the present disclosure, the expression, "input device" may be covered by the expression "display unit." The input device may be referred to as a display unit. Further, it shall be noted that, in various embodiments of the present disclosure, the display unit may be referred to as a touch screen (device).

In addition, various embodiments of the present disclosure may be applied to various electronic devices, rather than being limited to an electronic device that includes a touch screen. For example, various embodiments of the present disclosure may be applied to an electronic device in which a display unit and an input device are physically divided and separated from each other.

Figure 2:
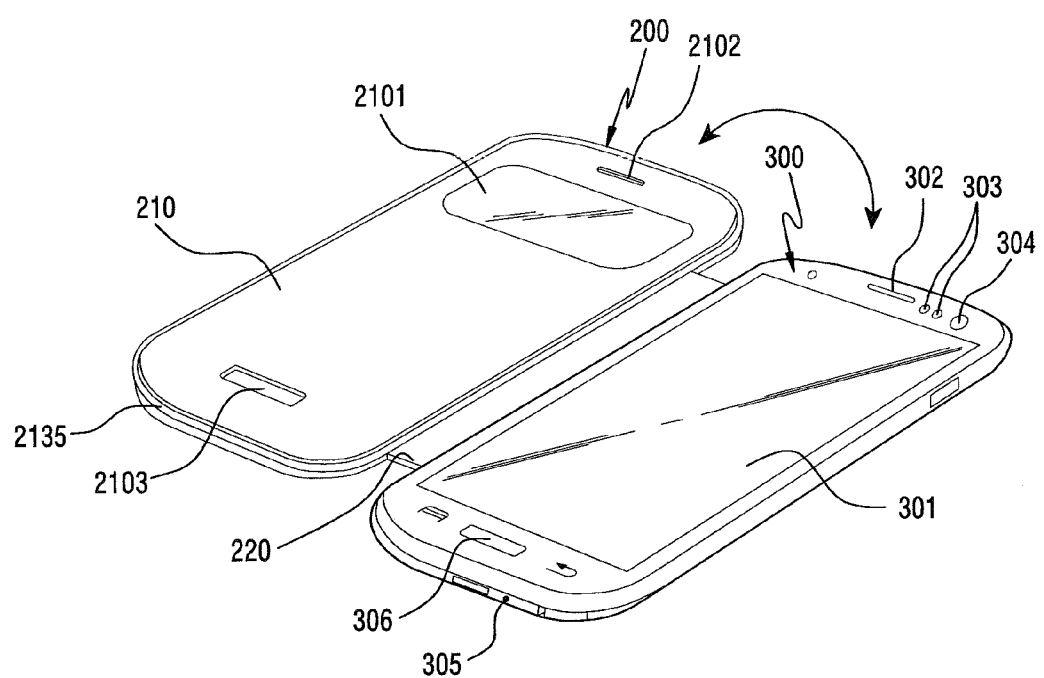
FIG. 2 is a perspective view illustrating an electronic device that includes an accessory device according to various embodiments of the present disclosure.
Figure 3:
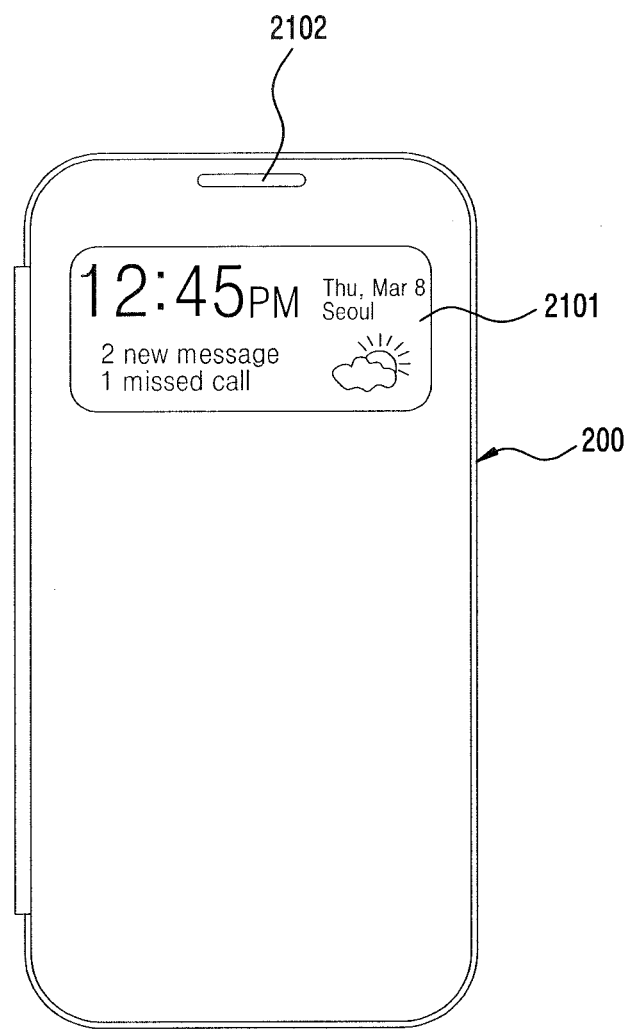
FIG. 3 is a plan view illustrating a closed state of a protection cover of an accessory device according to various embodiments of the present disclosure.
Figure 4:
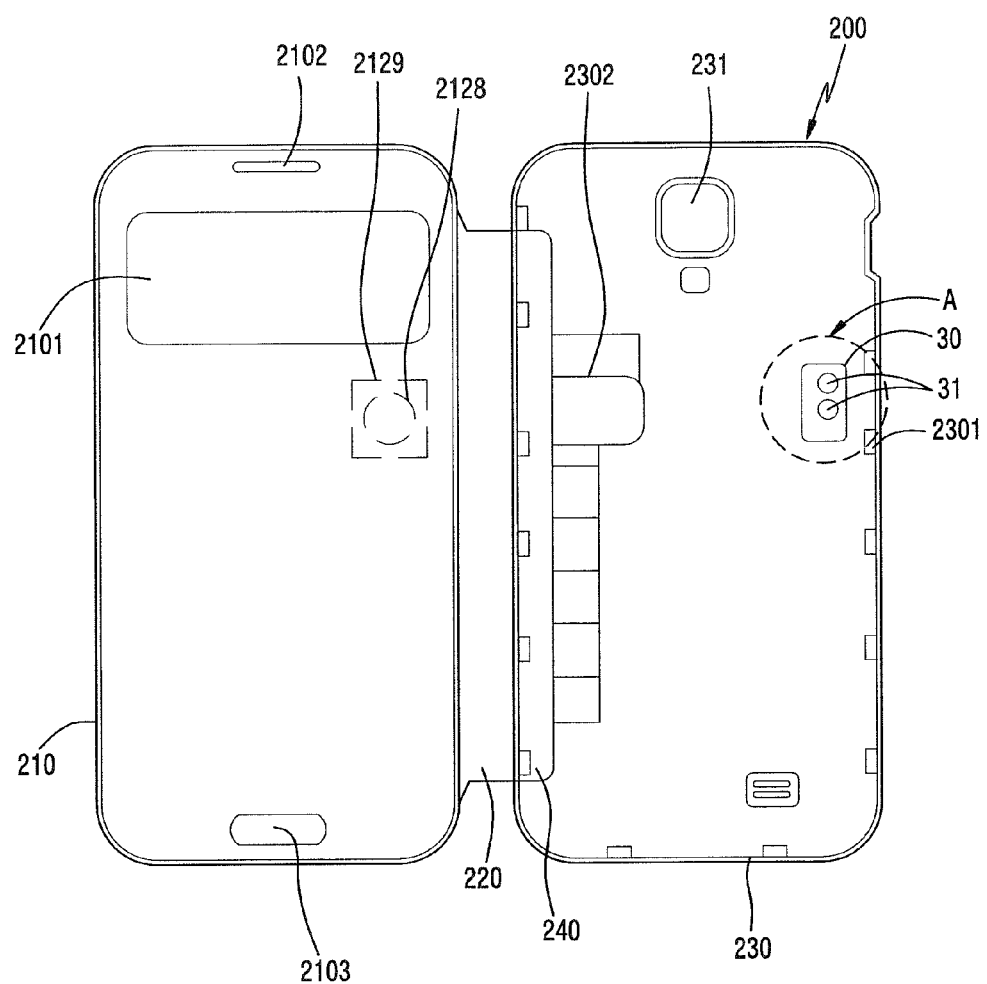
FIG. 4 is a view illustrating a configuration of a protection cover that includes an ID chip module according to various embodiments of the present disclosure.
Figure 5:
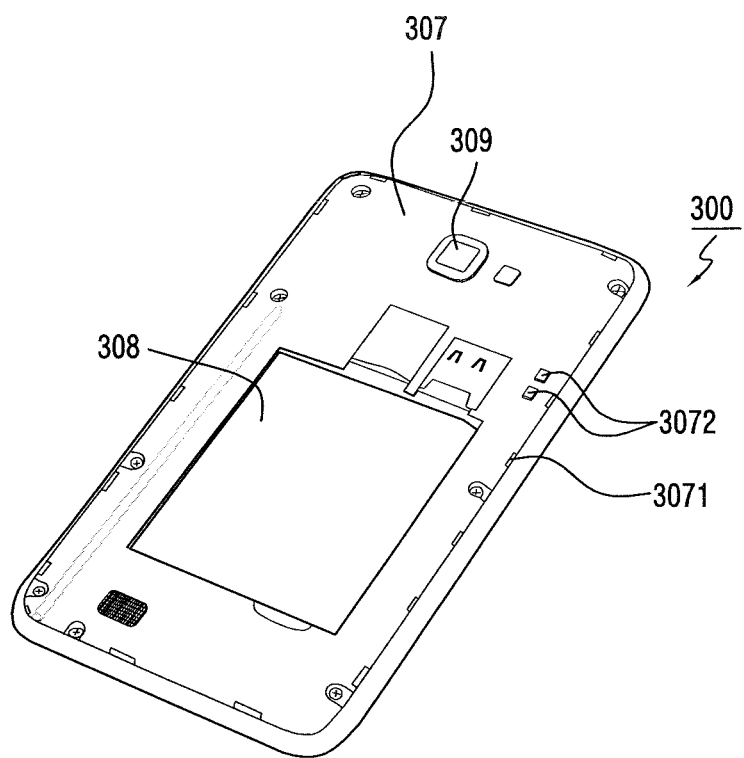
FIG. 5 is a perspective view illustrating the rear side of the electronic device according to various embodiments.

FIG. 2 is a perspective view illustrating an electronic device 300 that includes an accessory device 200 according to various embodiments of the present disclosure. FIG. 3 is a plan view illustrating a closed state of a protection cover of an accessory device according to various embodiments of the present disclosure. FIG. 4 is a view illustrating a protection cover that includes an ID chip module according to various embodiments of the present disclosure. FIG. 5 is a perspective view illustrating the rear side of the electronic device according to various embodiments.

Referring to FIGS. 2 to 5, an electronic device 300 to be protected by an accessory device 200 may include a display 301, a speaker module 302 that is arranged on the upper portion of the display 301, a plurality of sensors 303 that are arranged at one side of the speaker module 302, a camera module 304 that is arranged at one side of the plurality of sensors 303, and a microphone device 305 that is provided below the display 301. Without being limited thereto, however, other separate components may be added in addition to the above-mentioned components, and one or more components, other than the display, may be excluded from the above-mentioned components. According to one embodiment, the display 301 may be a touch screen device that includes a touch sensor.

According to various embodiments, the electronic device 300 may be protected by the accessory device 200 that is coupled or attached thereto. The accessory device 200 may include a support cover 230 that supports the rear face of the electronic device 300, a protection cover 210 that protects the front face of the electronic device 300, and a connecting portion 220 that interconnects the protection cover 210 and the support cover 230.

According to various embodiments, the support cover 230 may be installed to support the rear face of the electronic device 300. The protection cover 210 may be installed to be pivotable in a direction indicated by an arrow in FIG. 2, even if it is connected to the support cover 230 by the connecting portion 220. Accordingly, as illustrated in FIG. 2, the protection cover 210 may be arranged in a manner of being laid on the top of the display 301 of the electronic device 300 in order to protect the display 301 of the electronic device 300. As illustrated in FIG. 1, the protection cover 210 may be placed in a state of exposing the display 301 of the electronic device 300 so that the electronic device 300 can be used.

For example, when the protection cover 210 is pivoted about the support cover so that the protection cover 210 is in the state of overlapping with the display 301 of the electronic device 300, it will be described that the protection cover is closed, and when the protection cover 210 is pivoted about the support cover 230 so that the display 301 of the electronic device 300 is in the state where the display 301 is easily used by a direct touch, it will described that the protection cover 210 is opened.

According to various embodiments, when the protection cover 210 is provided with a transparent window 2101 and is closed, it is possible to visually observe a portion of the display 301 of the electronic device 300. Without being limited thereto, however, an opening having a predetermined size may be formed in the protection cover to serve as a window, without providing a separate transparent window. Accordingly, the electronic device 300 may determine that the protection cover 210 is closed and may display the status information of the electronic device 300 on the region of the display 301 that corresponds to the transparent window 2101 as illustrated in FIG. 2, so that the user may confirm the status information of the electronic device 300 through the transparent window 2101 even in the state where the protection cover 210 is closed.

While one transparent window 2101 is arranged on one side of the protection cover 210, various embodiments are not limited thereto. For example, depending on an operating method of the electronic device 300, a plurality of transparent windows may be arranged at different positions in the protection cover 210, respectively, to display information.

According to one embodiment, one or more button accommodation recesses 2103 may be formed on the face of the protection cover 210, which is to be in contact with the display 301 of the electronic device 300, in order to prevent a key button 306 (e.g., a home button), which protrudes from the electronic device 300, from being inadvertently pushed when the protection cover 210 is closed. In addition, a stepped portion 2135 may be formed in the peripheral edge of the face of the protection cover 210, which is to be in contact with the touch screen 301, so that, when the protection cover 210 is closed, the user may easily open the protection cover 210 by raising the stepped portion 2135 using a nail or the like. According to one embodiment, the protection cover 210 may be formed with a speaker opening 2102. According to one embodiment, when the protection cover 210 is closed, the speaker opening 2102 is located at a position that corresponds to the speaker module 302 of the electronic device 300, so that a function of the electronic device 300 (e.g., a call function) can be used even in the state where the protection cover 210 is closed.

According to various embodiments, the protection cover 210 is formed to have a size that is equal to that of the display 301 of the electronic device 300, but is not limited thereto. For example, the end of the protection cover 210 may be formed to somewhat further extend and to be foldable so that, when the protection cover 210 is closed, a side face of the electronic device 300 can also be protected. In addition, structures, which correspond to various key buttons, protruding or recessed components, and penetration-require components, which are applied to the electronic device 300, may be applied to the protection cover 210, the connecting portion 220, and the support cover 230. Also, waterproofing may be applied to the accessory device 200.

According to various embodiments, the support cover 230 may include a plurality of tension protrusions 2301 that are formed at predetermined intervals along an inner periphery of the support cover, and may be detachably assembled in the manner where the tension protrusions 2301 are seated in elastic grooves 3701 (FIG. 5) that are correspondingly formed on the rear face of the electronic device 300.

According to various embodiments, the support cover 230 may be formed of a synthetic resin material, but is not limited thereto. For example, the support cover 230 may be formed of various materials, such as a metal, GFRP, CFRP, rubber, silicon, PC, PC_ABS, and PC_GF, but is not limited thereto. The support cover 230 may be formed as a battery cover that is directly assembled to the rear face of the electronic device 300, but is not limited thereto. For example, the support cover 230 may be a separate injection-molded product that is formed separately from the electronic device 300 and accommodates the rear face of the electronic device 300. Even in such a case, there will be no problem as long as the ID chip module 30 according to an exemplary embodiment of the present disclosure, which is provided in the support cover 230, can be electrically connected to the connector 3072 (see FIG. 5) that is provided in the electronic device 300.

According to various embodiments, the protection cover 230 may be formed with an opening 231. The opening 231 may function to expose a component that is installed on the rear face of the electronic device 300 (e.g., the camera module 309 (see FIG. 5)). In such a case, various added products, such as an effect filter and a grey card for white balancing, may be further applied to the inside or outside of the support cover 230 through the opening 231.

According to various embodiments, the protection cover 210 may be provided with a magnet M, and a magnetic force sensing means may be provided at a corresponding position in the electronic device 300 so as to sense the magnetic force of the magnet M. According to one embodiment, the magnetic force sensing means may be installed at a position in the electronic device where the magnetic force of the magnet M can be sensed when the protection cover 210 is closed to be in contact with the display 301 of the electronic device 300. According to one embodiment, as the magnetic force sensing means, a hall sensor, a reed switch, or the like, which senses the magnetic force of the magnet M, may be used, but is not limited thereto.

According to various embodiments, due to the flexibility of the connecting portion 220 that interconnects the protection cover 210 and the support cover 230, the protection cover 210 is also movable in a direction of covering the support cover 230 from the rear side, as in the direction of covering the display 301 of the electronic device 300. Accordingly, even if the protection cover 210 is moved in the direction of covering the support cover from the rear side of the support cover 230, rather than being closed, the electronic device 300 may recognize this as if the protection cover 210 is closed due to the magnetic force of the magnet M that is provided in the protection cover 210. Thus, a shielding means 2302 may be required in order to shield the magnetic force of the magnetic force such that the magnetic force M cannot be recognized in the case where the protection cover 210 is moved in the direction of covering the support cover 230.

According to various embodiments, as illustrated in FIG. 4, such a shielding means 2302 may be located at a position on the support cover 230, which corresponds to the magnet M of the protection cover 210, when the protection cover 210 is moved in the direction of covering the rear side of the support cover 230. As the shielding means 2302, various materials may be used, which include a shielding layer that is capable of shielding the magnetic force of the magnet M. In one embodiment, the shielding means may be a sheet-like shielding material that is located at the corresponding position on the support cover 230. In one embodiment, as the material of the shielding means 2302, other alloys that have a magnetic permeability, such as a Fe-based alloy (amorphous alloy), a Ni-based alloy, or a Co-based alloy, may also be used. In one embodiment, as the shielding means 2302, a shielding material in the form of a sheet may be arranged at a corresponding position of the support cover 230.

According to various embodiments, when the protection cover 210 is closed to cover the display 301 of the electronic device 300, the electronic device 300 may sense that the protection cover is closed using one or more sensors. As the sensors, for example, a proximity sensor and an image sensor, which are arranged on the front face of the electronic device 300 to sense the closing of the protection cover 210, may be applied. According to one embodiment, as the sensors, a hall sensor or a reed switch may be applied to sense the magnetic force of the magnet M that is provided in the protection cover 210.

According to various embodiments, on the face of the support cover 230 that faces the electronic device 300, an ID chip module 30 according to various embodiments of the present disclosure may be installed. The ID chip module 30 may include unique status information of the accessory device 200 that is applied to the electronic device 300. According to one embodiment, the ID chip module 30 may be configured as a single unit, and may be fixed by being attached to the support cover 230. According to one embodiment, the ID chip module 30 may be arranged such that its terminals 31 are exposed so as to be electrically connected to the connector 3072 that is mounted to protrude on a cover mounting surface 307 of the electronic device 300.

Referring to FIG. 5, the cover mounting surface 307 is formed on the rear face of the electronic device 300, and a battery pack 308 and a camera module 309 may be mounted on the cover mounting surface 307. The battery pack 308 may be detachably mounted on the electronic device 300.

According to one embodiment, various additional means, such as a flash means, may be further provided on the rear face of the electronic device 300. At least one connector 3072 may be installed to protrude on the cover mounting surface 307. According to one embodiment, the connector 3072 may be installed at a position on the cover mounting surface 307 where the connector 3072 is to be connected with the terminals 31 of the ID chip module 30 that is installed on the support cover 230. According to one embodiment, as the connector 3072, various types of electric connecting means, such as a C-clip or a conductive poron tape, may be used.

According to various embodiments, in the case where the protection cover 210 has been closed after the accessory device 200 was mounted, the electronic device 300 may sense this and may then confirm the ID chip module 30. The electronic device 300 may detect unique status information of the accessory device 200 that is stored in the confirmed ID chip module 30 so as to output various pieces of information according to the features of the applied accessory device 200. According to one embodiment, the information may be output visually (e.g., through UI or the like). According to one embodiment, the information may be output acoustically (e.g., by voice, sound, or the like). According to one embodiment, the information may be output tactilely (e.g., by vibration or the like).

According to one embodiment, the electronic device 300 may display a unique UI on the display region thereof through the window 2101 of the protection cover 210, based on the unique status information of the accessory device 200, which is currently applied by the ID chip module 30. According to one embodiment, the electronic device 300 may display the unique UI in the same color as the color of the accessory device through the window 2101 of the protection cover 210, based on the unique status information of the accessory device 200, which is currently applied by the ID chip module 30. According to one embodiment, the electronic device 300 may display corresponding information on the whole of the display 301 of the electronic device 300, based on the unique status information of the accessory device 200 which is currently applied by the ID chip module 30.

According to various embodiments, depending on the kind of the applied accessory device, the electronic device 300 may detect different ID chip modules that are possessed by the corresponding accessory device, and may read unique status information of each of the ID chip modules, thereby outputting the corresponding information, a UI, or the like.

Figure 6:
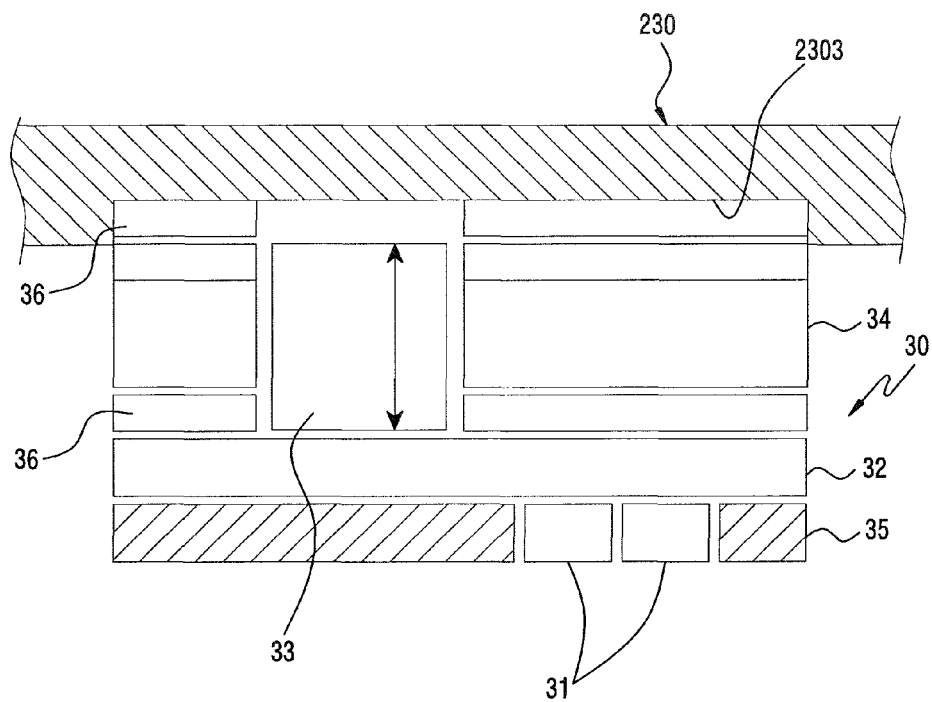
FIG. 6 is a cross-sectional view of a principal portion of region A in FIG. 4, illustrating a state in which an ID chip module is mounted on the protection cover according to various embodiments of the present disclosure.

FIG. 6 is a cross-sectional view of a principal portion of region A in FIG. 4, illustrating a state in which an ID chip module is mounted on the protection cover according to various embodiments of the present disclosure.

Referring to FIG. 6, the ID chip module 30 may be fixed by being attached to a face of the support cover 230 of the accessory device 200. According to one embodiment, the ID chip module 30 may be fixed by being partially inserted into a seating recess 2303 that is formed on the face of the support cover 230. The ID chip module 30 may be fixed to the face of the support cover 36 by a double-sided tape 230. According to one embodiment, the ID chip module 30 may be attached to the support cover 230 by an adhesion means, such as an adhesive.

According to various embodiments, in the ID chip module 30, an ID chip 33 may be mounted on a Flexible Printed Circuit (FPC) 32. The ID chip 33 may be mounted on the flexible printed circuit 32 in a Surface Mounted Device (SMD) type. A rigid body 34, which has a thickness that is at least larger than that of the ID chip 33, may be arranged on the remainder of the flexible printed circuit 32. According to one embodiment, the rigid body 34 may be made of a synthetic resin, and may include any other hard material. According to one embodiment, when the thickness of the rigid body 34 is formed to be larger than that of the ID chip 33, it is possible to prevent the ID chip 33 from being damaged by an external force.

According to various embodiments, on a face that is opposite to the face of the flexible printed circuit 32, on which the ID chip 33 is mounted, a plurality of terminals 31 may be mounted via a sheet 35 to be exposed. According to one embodiment, the terminals 31 may also be configured to be mounted on the flexible printed circuit 32 and to be electrically connected to the ID chip 33 by a pattern.

According to various embodiments, there may be provided an electronic device that includes: a display; an accessory device that is installed such that at least a portion of the accessory device covers at least of the display, and includes an ID chip module that has a unique status information; a sensor device that senses the opening/closing of the accessory device; and a processor that performs a control such that, in response to the sensing of the sensor device, at least one piece of information is output based on the unique information of the ID chip module.

According to various embodiments, the sensor device may be a hall sensor that senses a magnetic force of the magnet that is arranged in the accessory device.

According to various embodiments, the sensor device may be a proximity sensor or an image sensor that senses the opening/closing of the accessory device.

According to various embodiments, the accessory device may include: a support cover that is mounted on the rear face of the electronic device; a protection cover that is installed to cover at least a portion of the display that is arranged on the front face of the electronic device; and a connecting portion that movably connects the protection cover to the support cover.

According to various embodiments, the support cover is applied as a battery cover of the electronic device, and the ID chip module may be installed in the support cover, and may be electrically connected to a connector that protrudes from the cover mounting surface.

According to various embodiments, when the closing of the accessory device is sensed, the processor may display the at least one piece of information on the display region that corresponds to a transparent window that is included in the accessory device and has a predetermined area.

According to various embodiments, when the accessory device is opened, the at least one piece of information based on the unique information may be converted to be output on the whole or at least one region of the display.

According to various embodiments, the unique information of the ID chip module may be status information related to the accessory device.

According to various embodiments, the processor may perform a control such that the information related to the accessory device is displayed on the display, output by a voice/sound output means, or output by a tactile generation means.

According to various embodiments, when the accessory device is opened after a data input from the accessory device is sensed, the processor may perform a control such that a corresponding function based on the unique information is performed.

According to various embodiments, there may be provided an accessory device that includes: a support cover that supports the electronic device; a protection cover that is pivotally connected to the support cover, at least a portion of the display of the electronic device being installed to cover at least a portion of the display; and an ID chip module that is arranged in the support cover to provide unique information of the accessory device to the electronic device.

According to various embodiments, the ID chip module may be physically connected to the electronic device that is mounted on the accessory device.

According to various embodiments, the unique information may include at least one of the S/W version of the accessory device, the manufacture date of the accessory device, the manufacturer of the accessory device, the color of the accessory device, the kind of the accessory device, the input/output function of the accessory device, and the size of a window that is provided to the accessory device.

According to various embodiments, there may be provided an electronic device that includes: a display; a sensor device that senses an accessory device that selectively closes at least a region of the display; and a processor that performs a control such that at least one piece of information is output based on the unique information of the accessory device that is provided from the accessory device.

Figure 7:
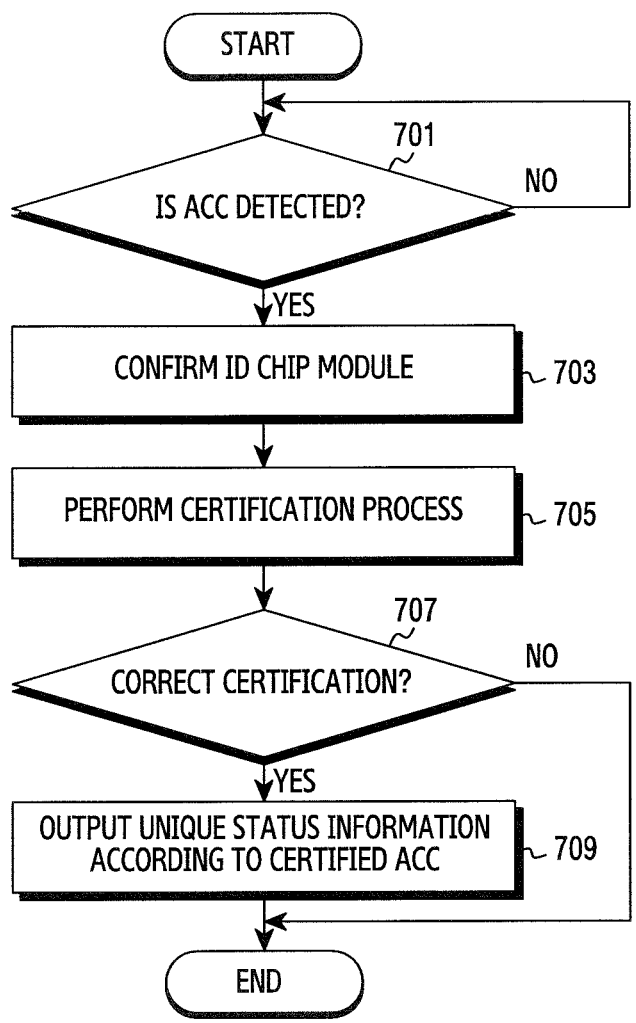
FIG. 7 is a flowchart illustrating a process for detecting an accessory by an electronic device according to various embodiments of the present disclosure.

FIG. 7 is a flowchart illustrating a process for detecting an accessory from an electronic device 300 according to various embodiments of the present disclosure. The electronic device 300 may be the electronic device 101 of FIG. 1.

Referring to FIG. 7, the electronic device 300 may perform operation 701 to confirm whether an accessory is detected. According to one embodiment, when the accessory is an accessory device 200, the electronic device 300 may detect whether the protection cover 210 is closed. According to one embodiment, the electronic device 300 may confirm whether the protection cover 210 is closed by detecting the magnetic force of the magnet M that is provided to the protection cover 210. According to one embodiment, the electronic device may detect whether the protection cover 210 is closed by a proximity sensor or an image sensor.

When the detection of the accessory is confirmed, the electronic device 300 may confirm the ID chip module 30 in operation 703. According to one embodiment, the electronic device 300 may confirm whether the accessory is detected in the state where the protection cover 210 is closed. According to one embodiment, the electronic device may confirm whether the accessory is detected, even if the protection cover 210 is not closed. In such a case, an operation of confirming whether the accessory is detected, and an operation of confirming whether the protection cover 210 is closed may be sequentially performed. According to one embodiment, upon sensing the closed state of the protection cover 210, the electronic device 300 may periodically confirm the ID chip module 30 (polling).

When the ID chip module 30 is confirmed, the electronic device 300 may perform a certification process in operation 705. This is to prevent the unique information of the accessory from being arbitrarily output when the applied accessory is illegally used, even if the ID chip module 30 is detected. According to one embodiment, the electronic device 300 may produce a preset random value and periodically transmit the random value to the ID chip module 30, and may produce a first encoding result value through a preset encoding algorithm. At the same time, the electronic device 300 may receive a second encoding result value from the ID chip module 30. According to various embodiments, the electronic device 300 may compare the first encoding result value, which is produced by itself, and the second encoding result value, which is received from the ID chip module 30. According to one embodiment, the electronic device 300 enters operation 707 to determine whether the certification is successful, and when the certification is successful (that is, when it is confirmed that the first encoding result value and the second encoding result value coincide with each other), the electronic device 300 may perform operation 709 to output unique status information according to the certified accessory.

Figure 8A:
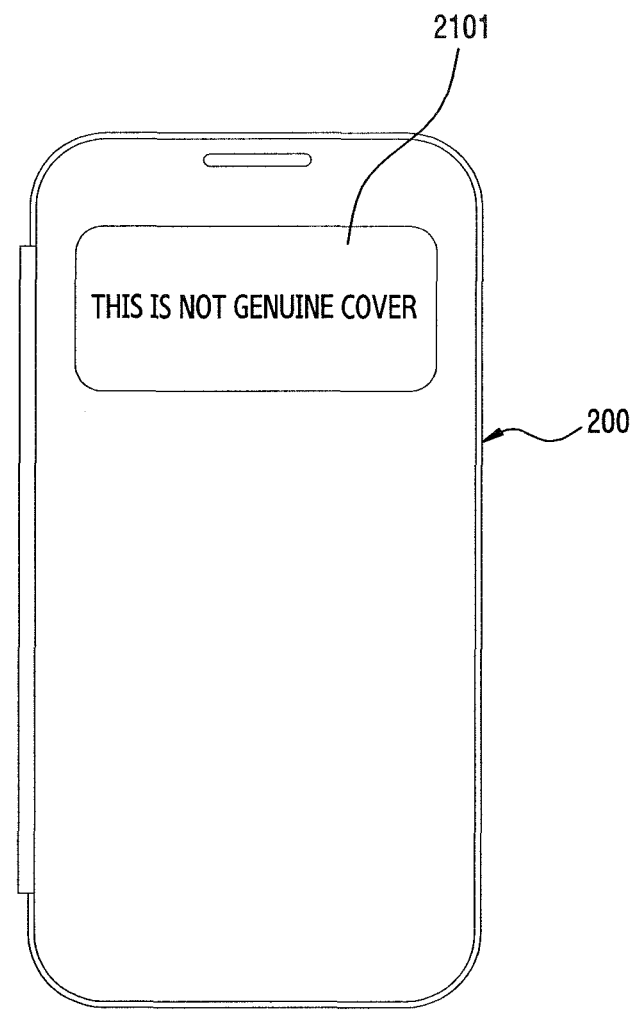
FIGS. 8A and 8B are views illustrating various states that are displayed on an electronic device according to various embodiments of the present disclosure when accessory certification is failed.
Figure 8B:
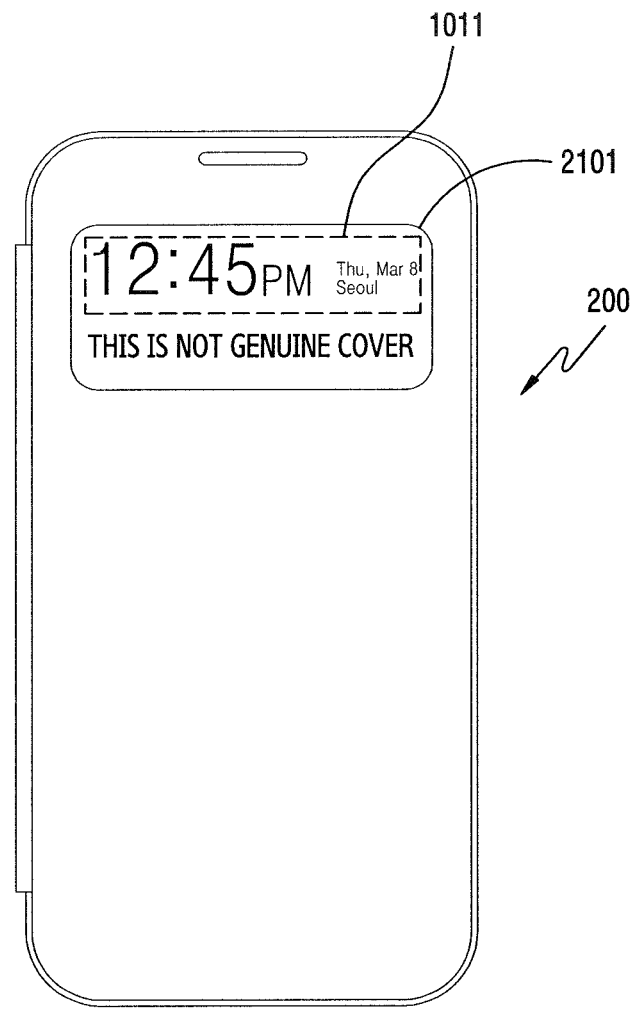

FIGS. 8A and 8B are views illustrating various states that are displayed on an electronic device when certification has failed according to various embodiments of the present disclosure.

According to various embodiments, in operation 707, when the certification is not allowed since the first encoding result value and the second encoding result value do not coincide with each other, the electronic device 300 may inform the user, in various manners, of the fact that the currently applied accessory device 200 is not a genuine product.

According to one embodiment, as illustrated in FIG. 8A, the electronic device 300 may inform the user of the fact that the currently used accessory device is not a genuine product by merely displaying a statement, "THIS IS NOT GENUINE COVER," on the window portion 2101 of the accessory device 200

According to one embodiment, as illustrated in FIG. 8B, the electronic device 300 may also inform the user of the fact that the currently used accessory device is not a genuine product by displaying a basic status information object 1011 of the electronic device 300 on the window portion 2101 of the accessory device 200 and adding the statement, "THIS IS NOT GENUINE PRODUCT," below the basic status information object 1011. According to one embodiment, the electronic device 300 may display warnings to prevent the user from using the accessory device while informing the user of the fact that the accessory device is not a genuine product.

Figure 9:
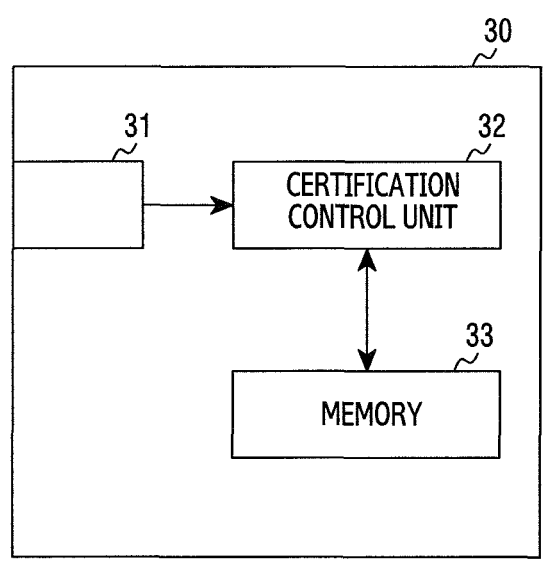
FIG. 9 is a block diagram of an ID chip module according to various embodiments of the present disclosure.

FIG. 9 is a block diagram of an ID chip module according to various embodiments of the present disclosure.

Referring to FIG. 9, the ID chip module 30 may include a certification control unit 32 and a memory 33. The certification control unit 32 may receive a random value from the electronic device 300, and may apply a preset encoding algorithm that is shared with the electronic device so as to generate a second encoding result value. The certification control unit 32 may provide the unique status information of the accessory device 200 that is requested by the electronic device 300.

The memory 33 may store various pieces of unique status information related to the accessory device 200. According to one embodiment, the memory 33 may store a preset encoding algorithm for applying the random value received from the electronic device 300.

According to one embodiment, The unique status information of the accessory device that is provided to the electronic device 300 by the ID chip module 30 may be as indicated in Table 1 and Table 2 below.

TABLE 1

| Item | SW REV | Reserve | Cover Color | Cover Kind | Function IO | Window Size |
|---|---|---|---|---|---|---|
| Assigned Bit Number | 8 bit (256 kinds) | 8 bit (256 kinds) | 8 bit (256 kinds) | 8 bit (256 kinds) | 8 bit (256 kinds) | See below |
| Detailed Spec. | REV0.x | Genuine, SMAPP etc. (Level 1, 2, 3 . . .) | Black, White, etc. | A, B, C (Flip, S view cover) | Function 1 Function 2 | |
| Preparation Example | 000 (dec) 0000 0000 (bin) | 000 (dec) 0000 0000 (bin) | 000 (dec) 0000 0000 (bin) | 000 (dec) 0000 0000 (bin) | 000 (dec) 0000 0000 (bin) | |

TABLE 2

| | Window Size | | | |
|---|---|---|---|---|
| Item | Central Coordinate (X) | Central Coordinate (Y) | Length (X) | Length (Y) |
| Assigned Bit Number | 8 bit | 8 bit | 8 bit | 8 bit |
| Detailed Spec. | 40 mm (0~256 mm) | 110 mm (0~256 mm) | 60 mm (0~256 mm) | 60 mm (0~256 mm) |
| Preparation Example | 40 (dec) 0010 1000 (bin) | 110 (dec) 0110 1110 (bin) | 60 (dec) 0011 1100 (bin) | 60 (dec) 0011 1100 (bin) |

As indicated in Table 1, the unique status information applied to the accessory may include one or more of, for example, the S/W version of an accessory device when the accessory device is used as the accessory, the manufacture date of the accessory device, the color of the accessory device, the kind of the accessory device, the input/output function of the accessory device, and the size of a window for each accessory device (e.g., the window 2101 that is arranged on the accessory device 200).

According to one embodiment, the encoding algorithm may be similarly applied to the encoding device 300 and the ID chip module 30. As such an encoding algorithm, the SHA-256 algorithm may be applied. The SHA-256 algorithm is a security algorithm that is defined in US NIST Spec. FIPS 180 and ISO/IEC 10118 as a method of the SHA-2.

Figure 10:
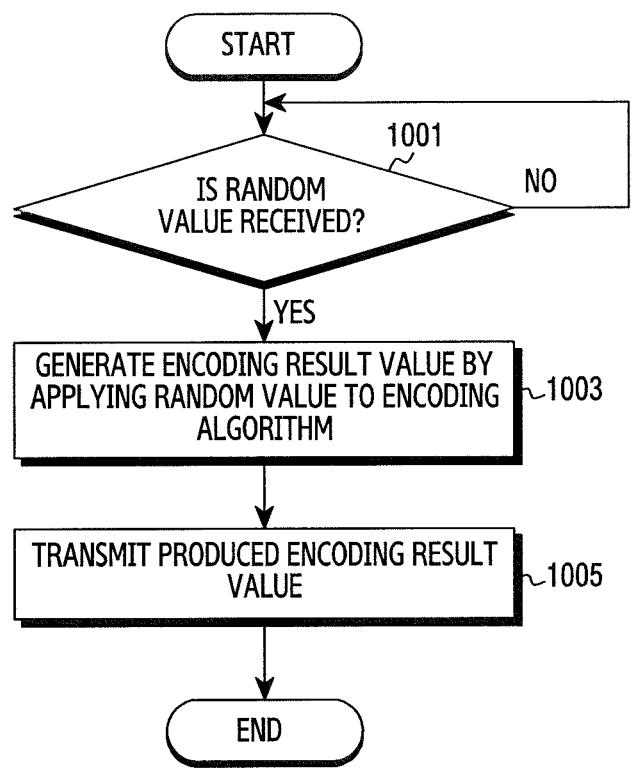
FIG. 10 is a flowchart illustrating an operation of an ID chip module according to various embodiments of the present disclosure.

FIG. 10 is a flowchart illustrating an operation of an ID chip module according to various embodiments of the present disclosure.

Referring to FIG. 10, The ID chip module 30 may perform operation 1001 to inspect whether the random value is received from the electronic device 300. According to one embodiment, upon receiving the random value from the electronic device 300, the ID chip module 30 may perform operation 1003 to produce an encoding result value by applying the random value to a previously stored encoding algorithm. According to one embodiment, the produced encoding result value is the same as the second encoding result value that is received by the electronic device from the ID chip module. According to one embodiment, the ID chip module 30 may perform operation 1005 to transmit the produced encoding result value to the electronic device.

According to various embodiments, the ID chip module 30 may also produce a reset signal according to a polling cycle that is transmitted from the electronic device, and may provide the reset signal to the electronic device 300.

According to various embodiments, when the certification process is successfully performed, the ID chip module 30 may receive a request for unique status information for the accessory from the electronic device 300, and may transmit the requested unique status information to the electronic device 300. According to one embodiment, the ID chip module 30 may directly and simultaneously provide the unique status information of the corresponding accessory to the electronic device 300 together with the encoding result value that is produced by the encoding algorithm.

According to various embodiments, when an object of the accessory is changed, the ID chip module 30 may delete the existing unique information that has been stored in the memory and may store new unique information. According to one embodiment, the ID chip module 30 may update the existing unique information stored in the memory by adding separate information.

Figure 11A:
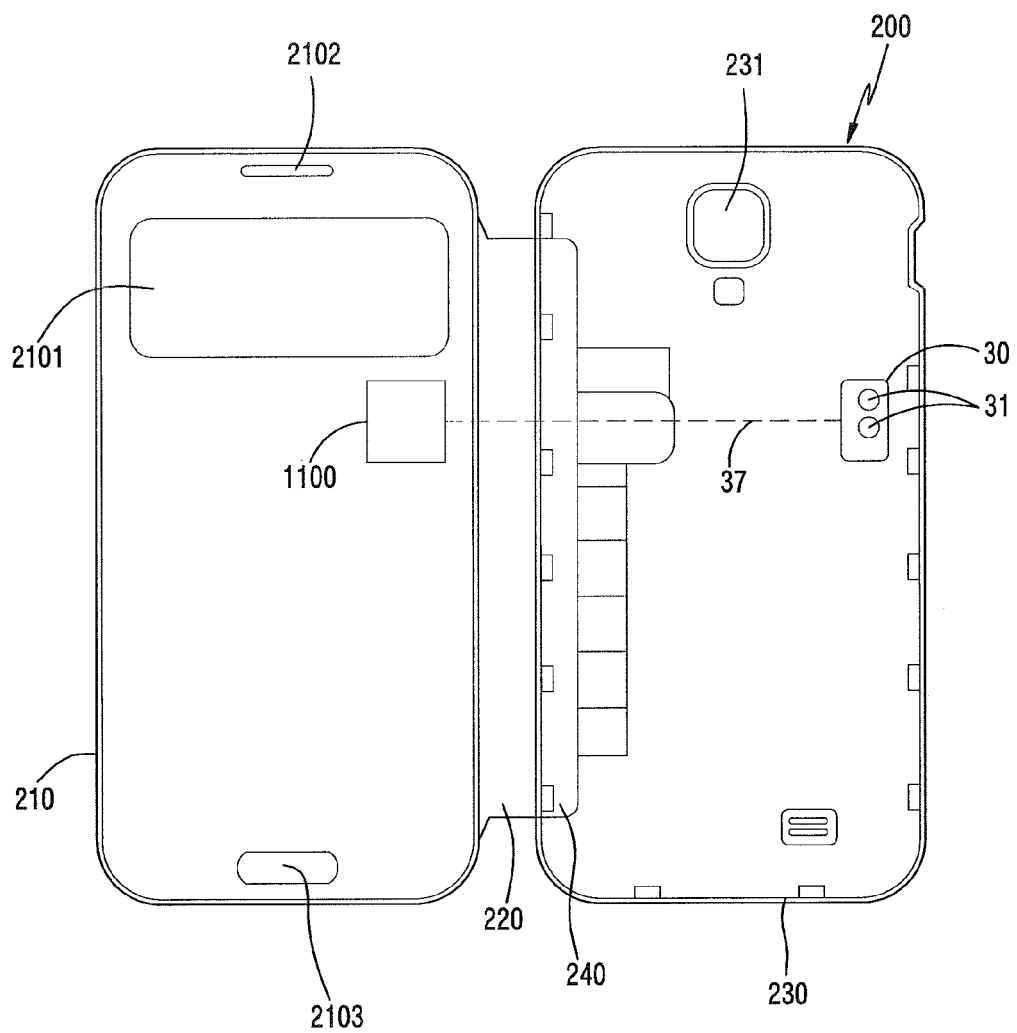
FIG. 11A is a view illustrating a configuration of an electrical connection between an ID chip module and an electronic component that are installed to a protection cover according to various embodiments of the present disclosure.

FIG. 11A is a view illustrating an electrical connection configuration between an ID chip module 30 and an electronic component 1100 that are installed on an accessory device 200 according to various embodiments of the present disclosure.

Referring to FIG. 11A, a unique function of the accessory applied to the electronic device 300 can be performed by correlating various kinds of electronic components 1100 provided to the accessory device 200 with the unique status information or function of the ID chip module 30.

According to one embodiment, simultaneously with applying power to electronic components 1100, which may be arranged at various positions of the accessory device (e.g., an LED indicator, a key button assembly, and a touch pad) by electrically interconnecting the terminal 31 that is provided to the ID chip module 30 and the connector that arranged on the rear face of the electronic device 300, and using a separate electric connecting means 37, the electronic components 1100 can be controlled. According to one embodiment, the electric connecting means 37 may be a well-known signal line, such as a thin-wire cable or a flexible printed circuit.

Figure 11B:
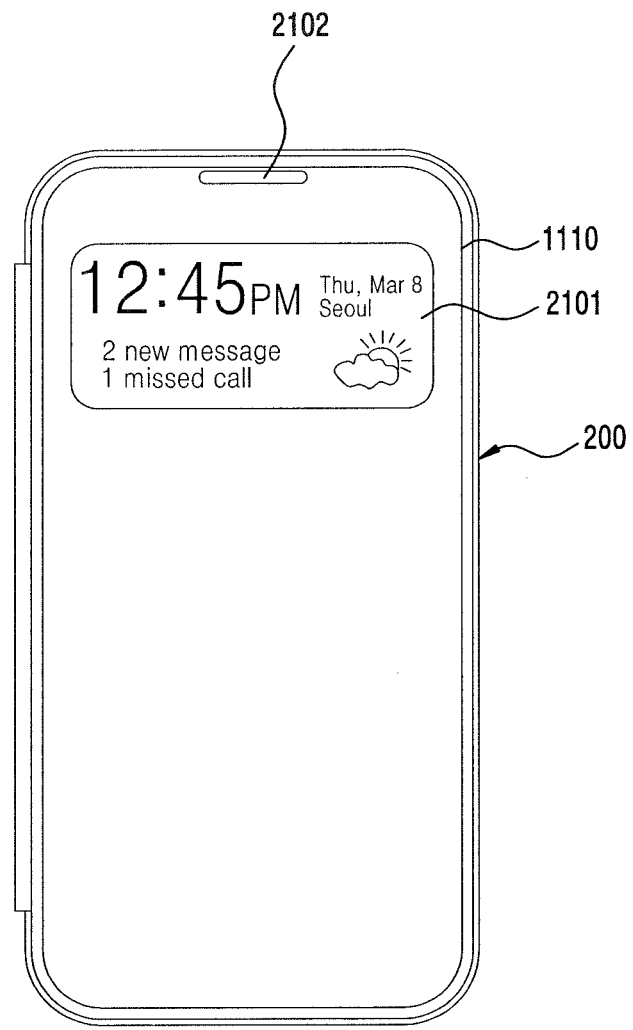
FIG. 11B is a view illustrating a configuration of an accessory device including an electronic component, according to various embodiments of the present disclosure.

FIG. 11B is a view illustrating a configuration of an accessory device 200 that includes an LED indicator 1110 as an electronic component according to various embodiments of the present disclosure.

Referring to FIGS. 11A and 11B, the LED indicator 1110 may be provided along the periphery of the front face of the accessory device 200. According to one embodiment, the electronic device 300 may turn on/off the LED indicator 1110, which visually indicates the status information of the electronic device 300, in various manners through the electric connecting means 37 that is electrically connected to the terminal 31 of the ID chip module 30.

Figure 12A:
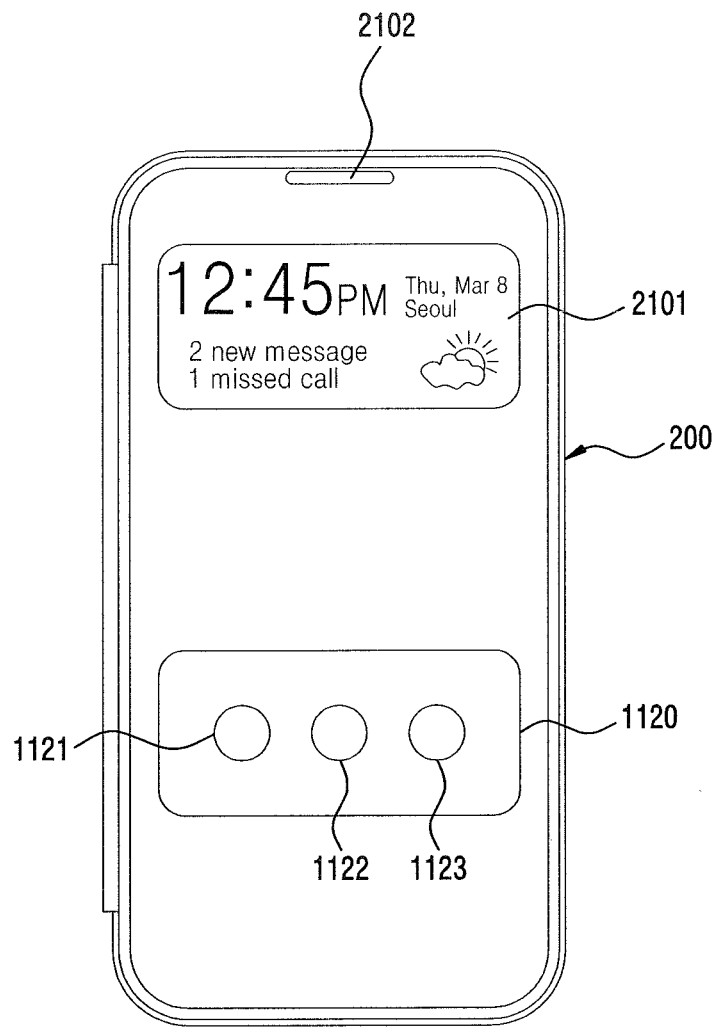
FIG. 12A is a view illustrating a configuration of an accessory device including an electronic component, according to various embodiments of the present disclosure.
Figure 12B:
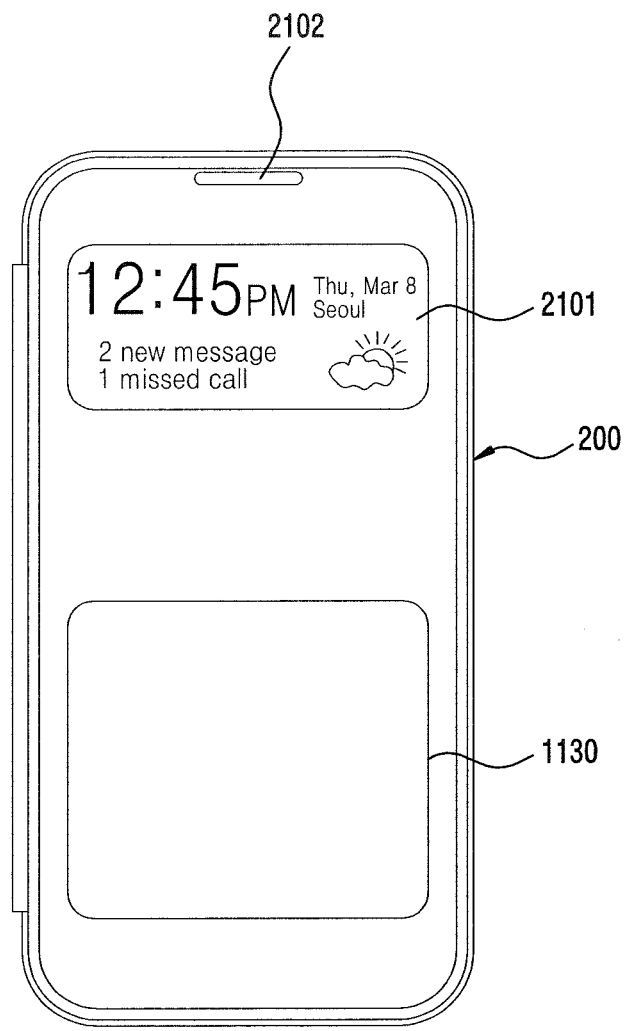
FIG. 12B is a view illustrating a configuration of an accessory device including an electronic component, according to various embodiments of the present disclosure.

FIG. 12A is a view illustrating a configuration of an accessory device 200 that includes a key button assembly 1120 as an electronic component according to various embodiments of the present disclosure. FIG. 12B is a view illustrating a configuration of an accessory device 200 that includes a touch pad 1130 as an electronic component according to various embodiments of the present disclosure.

Referring to FIGS. 12A and 12B, a key button assembly 1120 may be provided at a position on the front face of the accessory device 200. According to one embodiment, the key button assembly 1120 may include a plurality of key buttons 1121, 1122, and 1123. According to one embodiment, the plurality of key buttons 1121, 1122, and 1123 may play a role as shortcut keys for performing the corresponding functions of the electronic device 300 through the window even in the state where the accessory device 200 is closed. According to one embodiment, the key button assembly 1120 may be implemented as a touch pad region 1130. According to one embodiment, such a key button assembly may be implemented in a physical key button type of a metal dome type.

According to various embodiments, like the configuration of FIG. 11A, the key button assembly 1120 may be provided with a separate electric connecting means to be operated by receiving power and a control signal from the electronic device through the terminal of the ID chip module 30. According to one embodiment, when the key button assembly 1120 is operated as the touch pad region 1130, it may be implemented to directly sense a touch on the outer surface of the accessory device by extending the touch input range of the touch screen that is implemented as the display of the electronic device 300. In such a case, the use of a separate electric connecting means may be excluded.

According to various embodiments, the electronic device 300 may be operated by receiving unique status information for performing a corresponding function according to a touch of a corresponding position of the accessory device 200 from the ID chip module 30. According to one embodiment, when the size information of the window 2101 arranged on the accessory device 200 is received from the ID chip module 30 and another application is executed, the electronic device 300 may perform a control to display the corresponding information of the application that is currently executed to be suitable for the position corresponding to the size of the window.

FIGS. 13A to 13D are views illustrating use states of an electronic device 300 when touching a touch pad region 1130 installed on an accessory device 200 according to various embodiments of the present disclosure.

The accessory device 200 in FIGS. 13A to 13D includes a touch pad region as an electronic component, and FIGS. 13A to 13D illustrate the states in which various corresponding functions of the electronic device 300 are output in response to the corresponding touch inputs of the touch pad region 1130, respectively. According to one embodiment, like the configuration of FIG. 11A, the touch pad region 1130 may be provided with a separate electric connecting means 37 to be operated by receiving power and a control signal from the electronic device 300 through the terminal of the ID chip module 30. According to one embodiment, the touch pad region 1130 may be implemented to directly sense a touch on the outer surface of the accessory device by extending the touch input range of the touch screen that is implemented as the display of the electronic device 300. In all the above-described cases, the unique operation information for performing the corresponding functions according to the kinds of touch inputs that are sensed by the electronic device 300 may be received from the ID chip module 30.

Figure 13A:
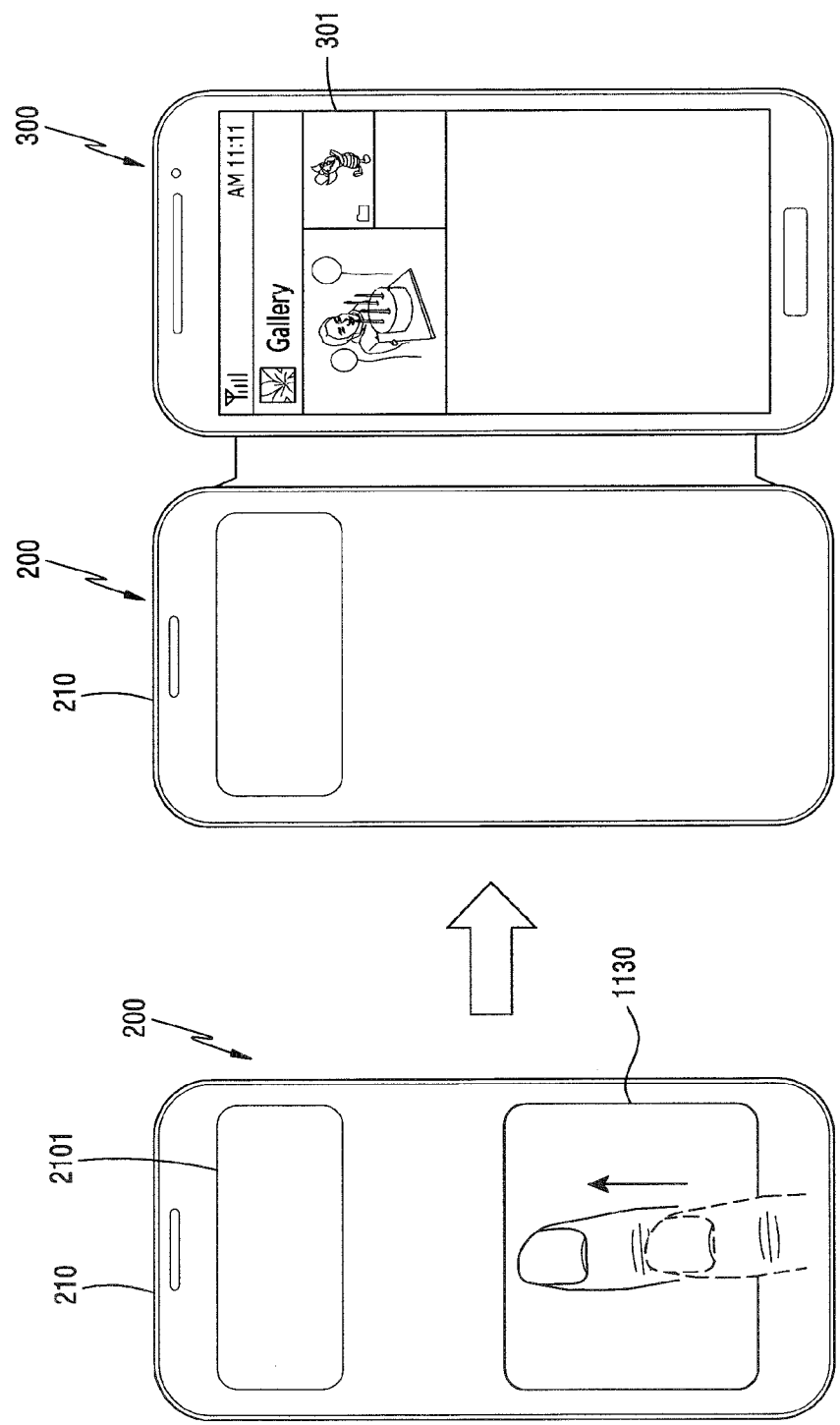
FIGS. 13A to 13D are views illustrating use states of an electronic device when touching a touch pad region installed on an accessory device according to various embodiments of the present disclosure.

Referring to FIG. 13A, in the state where the protection cover 210 of the accessory device 200 is closed, it is possible to touch the touch pad region 1130 and to then perform an upward drag. Thereafter, when the protection cover 210 is opened within a predetermined length of time, the electronic device 300 may automatically execute a gallery program through the display 301.

Figure 13B:
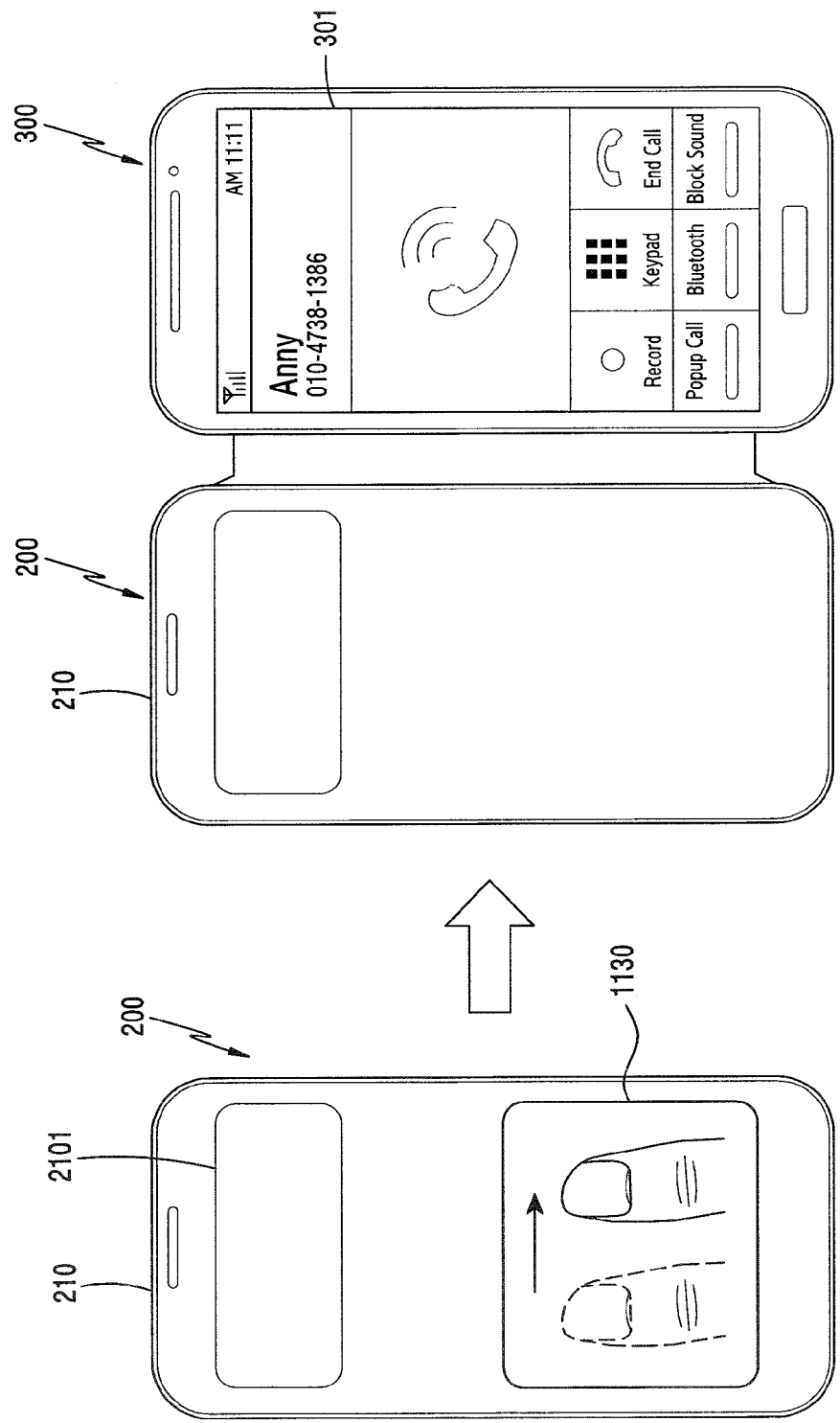

Referring to FIG. 13B, in the state where the protection cover 210 of the accessory device 200 is closed, it is possible to touch the touch pad region 1130 and to then perform a rightward drag. Thereafter, when the protection cover 210 is opened within a predetermined length of time, the electronic device 300 may automatically execute a call connecting function.

Figure 13C:
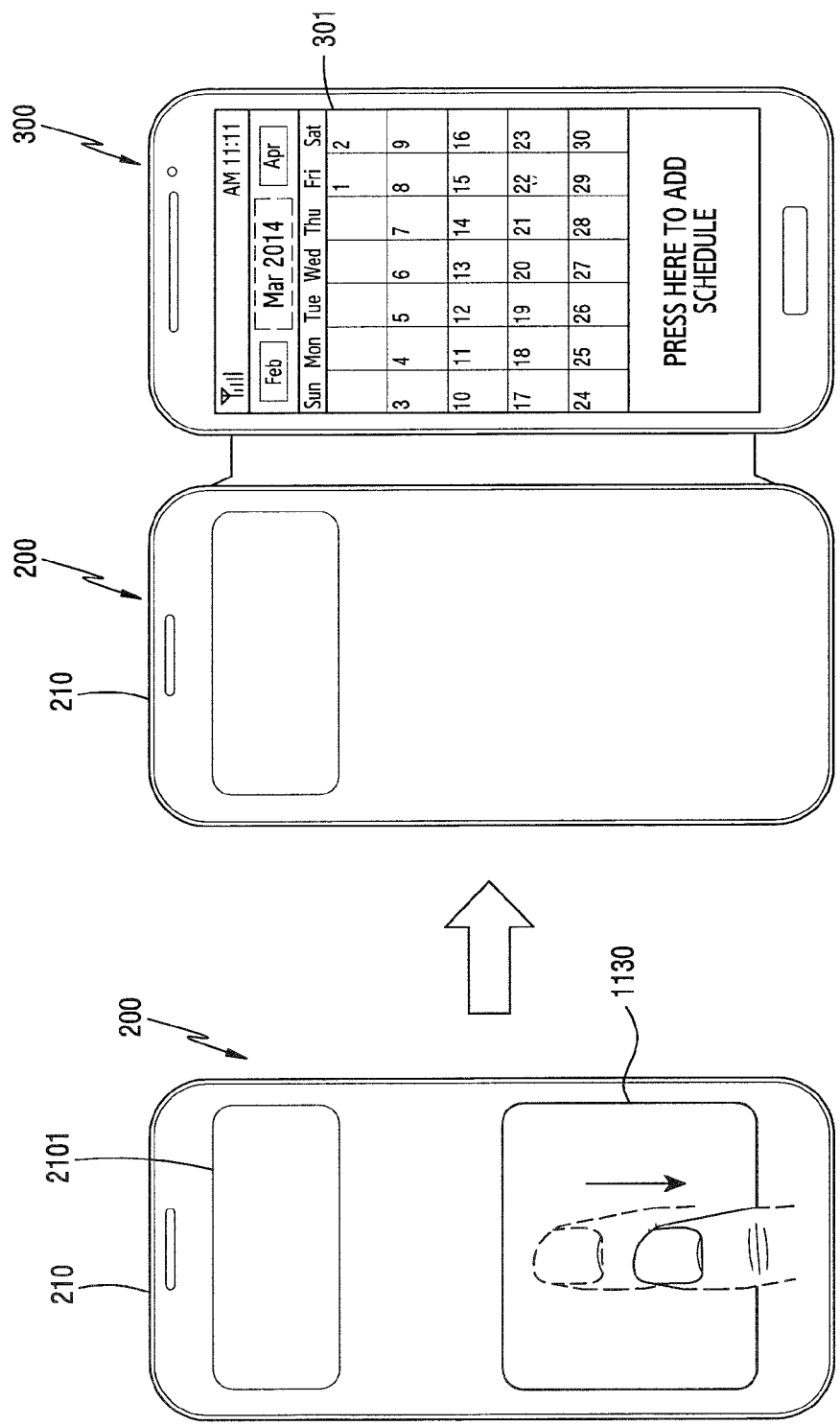

Referring to FIG. 13C, in the state where the protection cover 210 of the accessory device 200 is closed, it is possible to touch the touch pad region 1130 and to then perform a downward drag. Thereafter, when the protection cover 210 is opened within a predetermined length of time, the electronic device 300 may automatically execute a scheduler function.

Figure 13D:
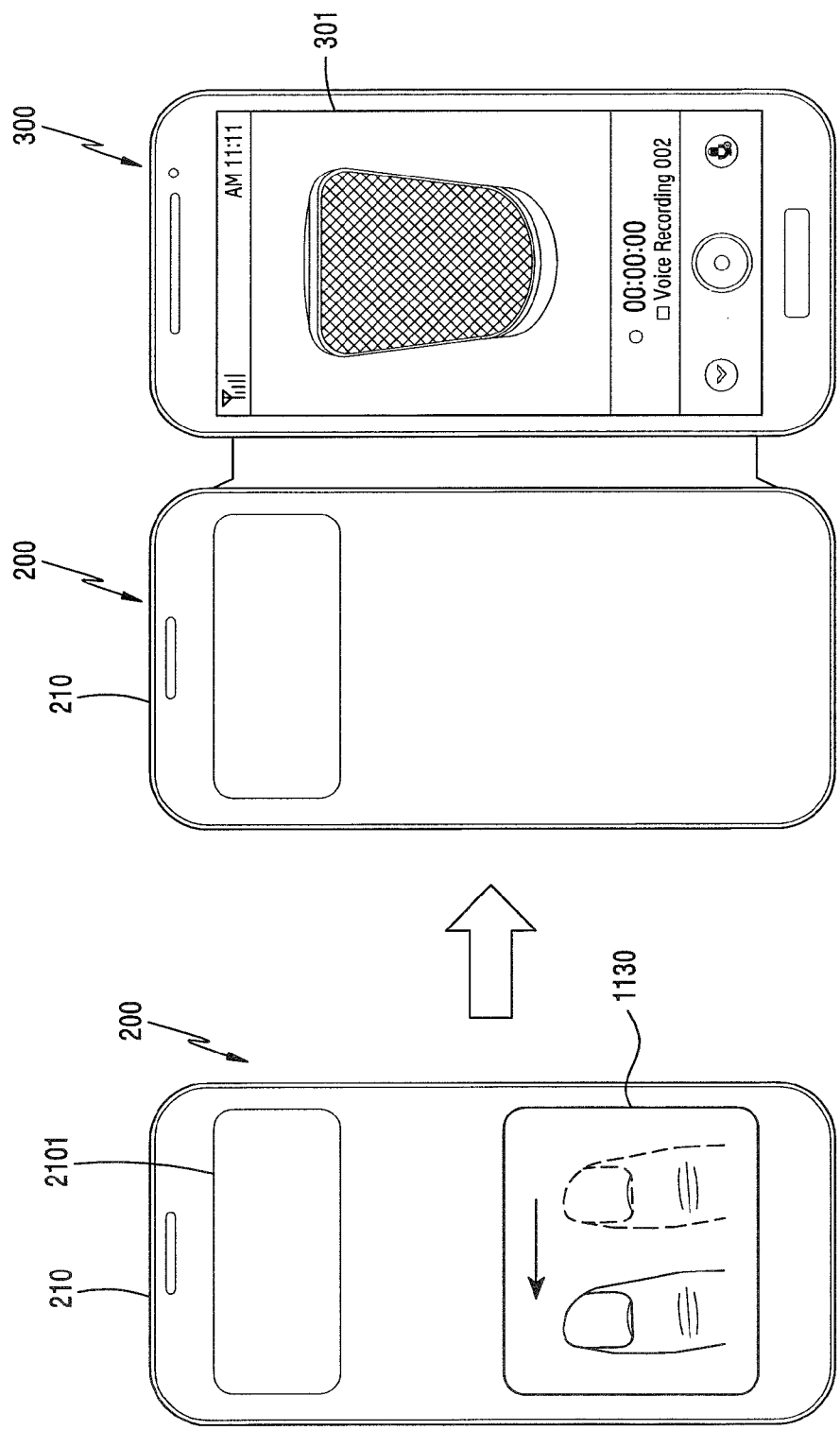

Referring to FIG. 13D, even in the state where the protection cover 210 of the accessory device 200 is closed, it is possible to touch the touch pad region 1130 and to then perform a leftward drag. Thereafter, when the protection cover 210 is opened within a predetermined length of time, the electronic device 300 may automatically execute a voice recording function.

According to various embodiments, the electronic device 300 may perform a control such that various corresponding functions may be performed according to various touch types on the touch pad region 1130. According to one embodiment, the corresponding functions may be performed by receiving unique status information or function information that is stored in the ID chip module 30.

According to various embodiments, prior to opening the protection cover 210 of the accessory device 200, an executed object (e.g., an application) may be displayed in advance through the window 2101 of the protection cover 210.

According to various embodiments, when a heartbeat measuring sensor is applied to the accessory device 200 as an electronic component, functions associated with the heartbeat measuring sensor may be additionally shown as a menu or may be performed when a previously defined function (e.g., a health-related application) is executed. According to various embodiments, there may be provided a method of operating an electronic device that includes an accessory device that is installed to cover a display. The method may include an operation of confirming whether the accessory device is closed, an operation of confirming unique information related to the accessory device when the accessory device is closed, and an operation of performing one or more functions based on the confirmed unique information.

According to various embodiments, the unique information may include operations that are stored in an ID chip module that is arranged on the accessory device and is electrically connected to the electronic device.

According to various embodiments, the method may further include an operation of performing a certification process with the ID chip module prior to the operation of confirming the unique information.

According to various embodiments, the method may include an operation of producing a first encoding result value by producing a random value and applying the random value to a preset encoding algorithm, an operation of transmitting the random value to the ID chip module and receiving a second encoding result value, and an operation of comparing the first encoding result value and the second encoding result value with each other.

According to various embodiments, the method may include an operation of outputting at least one piece of information based on the unique information when the first encoding result value and the second encoding result value coincide with each other as a result of the comparison.

According to various embodiments, the method may include an operation of outputting information of informing the erroneous application of the accessory device when the first encoding result value and the second encoding result value do not coincide with each other as a result of the comparison.

According to various embodiments, the at least one piece of information may be output by displaying the unique information associated with the accessory device on the display, may be output by a voice/sound output means, or may be output by a tactile generation means.

According to various embodiments, the method may include an operation of confirming a data input through the accessory device in the state where the accessory device is closed, an operation of confirming whether the accessory device is opened, and an operation of performing a function corresponding to the data input based on the unique information.

According to various embodiments, there may be provided a method of operating an operation. The method may include an operation of confirming whether the accessory is confirmed, an operation of confirming unique information related to the accessory as the accessory is sensed, and an operation of outputting one or more functions based on the confirmed unique information.

According to various embodiments, the unique information may be provided to the accessory, and may be stored to the ID chip module that is electrically connected to the electronic device.

Figure 14:
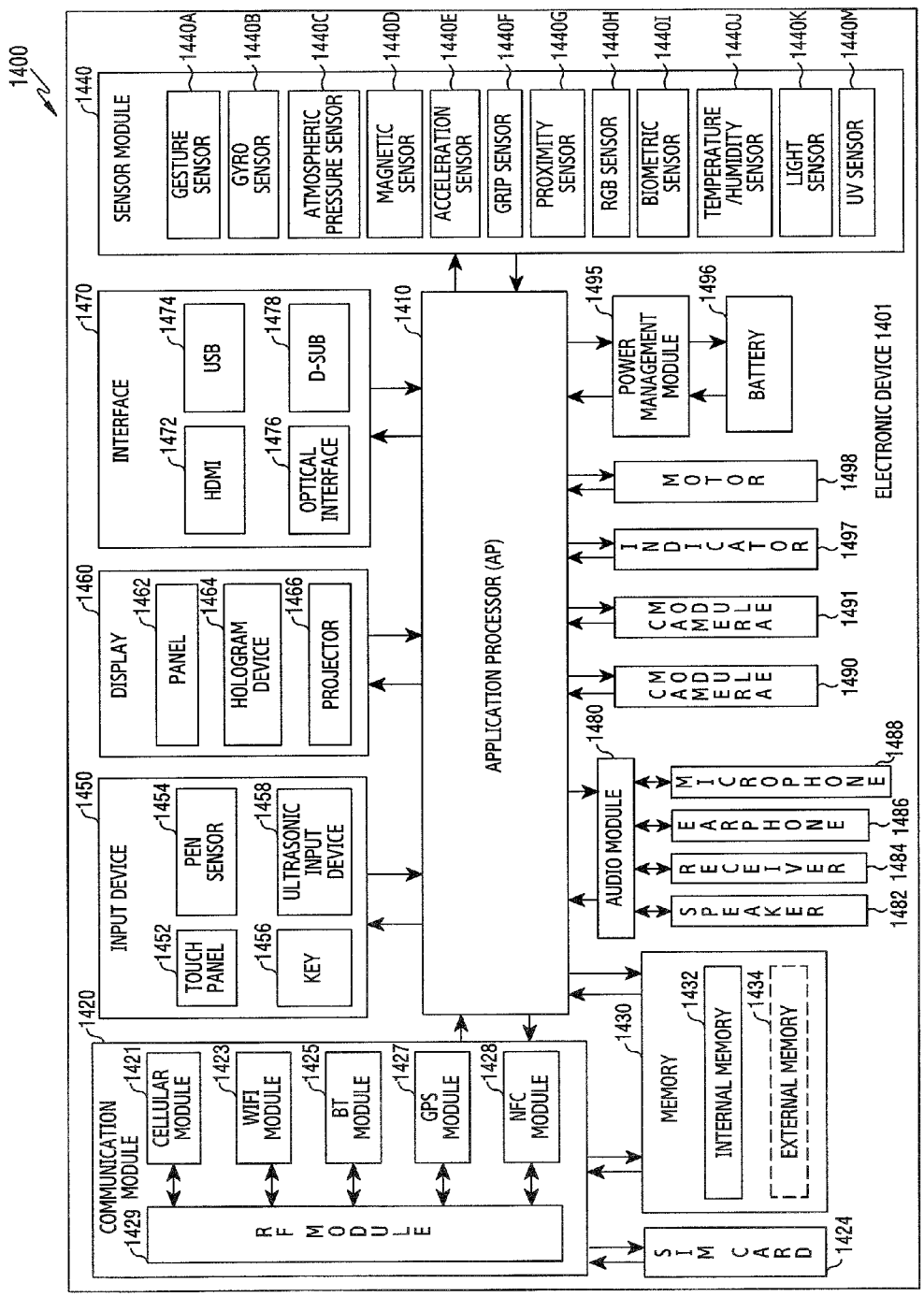
FIG. 14 is a block diagram of an electronic device according to various embodiments of the present disclosure.

FIG. 14 illustrates a block diagram 1400 of an electronic device according to various embodiments of the present disclosure.

Referring to FIG. 14, the electronic device 1401 may include, for example, the entirety or a portion of the electronic device 101 illustrated in FIG. 1. Referring to FIG. 14, the electronic device 1401 may include at least one Application Processor (AP) 1410, a communication module 1420, a Subscriber Identification Module (SIM) card 1424, a memory 1430, a sensor module 1440, an input device 1450, a display 1460, an interface 1470, an audio module 1480, a camera module 1491, a power management module 1495, a battery 1496, an indicator 1497, and a motor 1498.

The AP 1410 may drive an operating system or an application program so as to control a plurality of hardware or software components connected thereto, and may also perform various data processing and arithmetic operations. The AP 1410 may be implemented by, for example, a System-on-Chip (SoC). According to one embodiment, the AP 1410 may further include a Graphic Processing Unit (GPU) (not illustrated).

The communication module 1420 (e.g., the communication interface 160) may perform data transmission/reception the other electronic devices (e.g., the electronic device 104 and the server 106) that are connected to the electronic device 1401 (e.g., the electronic device 101) through a network. According to one embodiment, the communication module 1420 may include a cellular module, 1421, a WiFi module 1423, a BT module 1425, a GPS module 1427, an NFC module 1428, and an RF module 1429.

The cellular module 1421 may provide a voice call service, a video call service, a messaging service, an internet service, or the like through a communication network (e.g., LTE, LTE-A, CDMA, WCDMA, UMTS, WiBro, or GSM). In addition, the cellular module 1421 may perform discrimination and authentication of the electronic device within the communication network by using the subscriber identification module (e.g., a SIM card 1424). According to one embodiment, the cellular module 1421 may perform at least a portion of a function that may be provided by the AP 1410.

For example, the cellular module 1421 may perform at least a portion of a multimedia control function.

According to one embodiment, the cellular module 1421 may include a Communication Processor (CP). In addition, the cellular module 1421 may be implemented with, for example, an SoC. FIG. 14 illustrates the components, such as the cellular module 1421 (e.g., a communication processor), the memory 1430, and the power management module 1495 as the components that are separated from the AP 1410. According to one embodiment, the AP 1410 may be implemented with at least some of the above-mentioned components (e.g., the cellular module 1421).

According to one embodiment, the AP 1410 or the cellular module 1421 (e.g., a communication processor) may process load commands or data that are received from a non-volatile memory that is connected to each of them or at least one of other components, by loading the commands or data to a volatile memory. In addition, the AP 1410 or the cellular module 1421 may store data, which are received from or generated by at least one of the other components, in the non-volatile memory.

Each of the WiFi module 1423, the BT module 1425, the GPS module 1427, and the NFC module 1428 may include, for example, a processor to process data transmitted/received through a corresponding module. FIG. 14 illustrates the cellular module 1421, the WiFi module 1423, the BT module 1425, the GPS module 1427, and the NFC module 1428 by separate blocks, respectively. According to one embodiment, however, at least some (e.g., two or more) of the cellular module 1421, the WiFi module 1423, the BT module 1425, the GPS module 1427, and the NFC module 1428 may be incorporated in a single Integrated Chip (IC) or an IC package. For example, at least some of the processors, which correspond to the cellular module 1421, the WiFi module 1423, the BT module 1425, the GPS module 1427, and the NFC module 1428, respectively (e.g., a communication processor that corresponds to the cellular module 1421 and a WiFi processor that corresponds to the WiFi module 1423), may be implemented by a single SoC.

The RF module 1429 may perform data transmission/reception (e.g., transmission/reception of an RF signal). Although not illustrated, the RF module 1429 may include, for example, a transceiver, a Power Amp Module (PAM), a frequency filter, or a Low Noise Amplifier (LNA). The RF module 1429 may further include a component for transmission/reception of RF waves in a free space in wireless communication (e.g., a conductor or a conducting line). FIG. 14 illustrates that the cellular module 1421, the WiFi module 1423, the BT module 1425, the GPS module 1427, and the NFC module 1428 share a single RF module 1429. According to one embodiment, at least one of the cellular module 1421, the WiFi module 1423, the BT module 1425, the GPS module 1427, and the NFC module 1428 may transmit/receive an RF signal through one or more separate RF modules.

The SIM card 1424 may be a card that includes a subscriber identification module, and may be inserted into a slot that is formed at a specific position of the electronic device. The SIM card 1424 may include unique identification information (e.g., Integrated Circuit Card Identifier (ICCID) or subscriber information (e.g., international mobile subscriber identity (IMSI)).

The memory 1430 (e.g., the memory 130) may include an internal memory 1432 or an external memory 1434. The internal memory 1432 may include at least one of, for example, a volatile memory (e.g., Dynamic RAM (DRAM), Static RAM (SRAM), or Synchronous DRAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, NOR flash memory, hard drive, or Solid State Drive (SSD)).

According to one embodiment, the internal memory 1432 may be a Solid State Drive (SSD). The external memory 1434 may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 1434 may be functionally connected to the electronic device 1401 through various interfaces. According to one embodiment, the electronic device 1401 may include a storage device (or a storage medium), such as a hard drive.

The sensor module 1440 may measure a physical quantity or may sense an operating status of the electronic device 1401, and may then convert the measured or sensed information into electric signals. The sensor module 1440 may include at least one of, for example, a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (e.g., RGB (Red, Green, Blue) sensor), a biometric sensor 1440I, a temperature/humidity sensor 1440J, an illuminance sensor 1440K, and a Ultra-Violet (UV) sensor 1440M. Additionally or alternatively, the sensor module 1440 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), an Infra-Red (IR) sensor (not illustrated), an iris sensor (not illustrated), and/or a fingerprint sensor (not illustrated). The sensor module 1440 may further include a control circuit for controlling one or more sensors incorporated therein.

The input device 1450 may include a touch panel 1452, a (digital) pen sensor 1454, a key 1456, or an ultrasonic input device 1458. The touch panel 1452 may recognize a touch input through at least one of, for example, a capacitive type, a resistive type, an infrared type, and an ultrasonic type. Also, the touch panel 1452 may further include a control circuit. The capacitive type may recognize a physical contact or proximity. The touch panel 1452 may further include a tactile layer. In such a case, the touch panel 1452 may provide a tactile reaction to the user.

The (digital) pen sensor 1454 may be implemented by using, for example, a method that is equal or similar to receiving a user's touch input or a separate recognition sheet. The key 1456 may include, for example, a physical button, an optical key, or a keypad. The ultrasonic input device 1458 is a device that is capable of confirming data by sensing sound waves with a mic (e.g., the mic 1488) in the electronic device 1401 through an input tool that generates an ultrasonic signal. The ultrasonic input device 1458 is capable of performing wireless recognition. According to one embodiment, the electronic device 1401 may receive a user input from an external device (e.g., a computer or a server) that is connected thereto by using the communication module 1420.

The display 1460 (e.g., the display 150) may include a panel 1462, a hologram device 1464, or a projector 1466. The panel 1462 may be, for example, a Liquid Crystal Display (LCD), an Active-Matrix Organic Light-emitting Diode (AM-OLED). The panel 1462 may be implemented to be, for example, flexible, transparent, or wearable. The panel

1462 may be configured as a single module with the touch panel 1452. The hologram device 1464 may show a stereoscopic image in the air using interference of light. The projector 1466 may project light onto a screen so as to display an image. The screen may be located, for example, inside or outside the electronic device 1401. According to one embodiment, the display 1460 may further include a control circuit to control the panel 1462, the hologram device 1464, or the projector 1466.

The interface 1470 may include, for example, a High-Definition Multimedia Interface (HDMI) 1472, a Universal Serial Bus (USB) 1474, an optical interface 1476, or a D-subminiature (D-sub) 1478. The interface 1470 may be included in, for example, the communication interface 160 illustrated in FIG. 1. Additionally or alternatively, the interface 1470 may include, for example, a Mobile High-definition Link (MHL) interface, a Secure Digital (SD) card/Multi-Media Card (MMC) interface, or an Infrared Data Association (IrDA) standard interface.

The audio module 1480 may bi-directionally convert sound and an electric signal. At least some of the components of the audio module 1480 may be included in, for example, the input/output interface 140 illustrated in FIG. 1. The audio module 1480 may process sound information input or output through, for example, a speaker 1482, a receiver 1484, an earphone 1486, or a microphone 1488.

The camera module 1491 is a device that is capable of photographing a still image and a video image. According to one embodiment, the camera module 1491 may include at least one image sensor (e.g., a front sensor or a rear sensor), a lens (not illustrated), an Image Signal Processor (ISP), or a flash (e.g., LED or xenon lamp) (not illustrated).

The power management module 1495 may manage the electric power of the electronic device 1401. Although not illustrated, the power management module 1495 may include a Power Management Integrated Circuit (PMIC), a charger Integrated Circuit (IC), or a battery or fuel gauge.

The PMIC may be equipped inside, for example, an integrated circuit or an SoC semiconductor. The charging type may be classified into a wired type and a wireless type. The charge IC may charge the battery, and may prevent the inflow of an overvoltage or an overcurrent. According to one embodiment, the charge IC may include a charge IC for at least one of the wired charge type and the wireless charge type. The wireless charge type may include, for example, a magnetic resonance type, a magnetic induction type, or an electromagnetic wave type, and may further include an additional circuit for wireless charging, such as a coil loop, a resonance circuit, or a rectifier.

The battery gauge may measure the residual capacity of the battery 1496, and a voltage, a current, or a temperature during the charge. The battery 1496 may store or generate electricity, and may supply power to the electronic device 1401 by using the stored or generated electricity. The battery 1496 may include, for example, a rechargeable battery or a solar battery.

The indicator 1497 may indicate a specific status of the electronic device 1401 or of a part thereof (e.g., AP 1410), such as a booting status, a message status, or a charged status. The motor 1498 may convert an electric signal into a mechanical vibration. Although not illustrated, the electronic device 1401 may include a processor (e.g., GPU) to support a mobile TV. The processor to support a mobile TV may process media data according to the standards of, for example, Digital Multimedia Broadcasting (DMB), Digital Video Broadcasting (DVB), or media flow.

The above described components of the electronic device according to various embodiments of the present disclosure may be formed of one or more components, and a name of a corresponding component element may be changed based on the type of electronic device. In various embodiments of the present disclosure, the electronic device may include at least one of the above-described elements, and may exclude some of the elements or further include other additional elements. Further, some of the components of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least some of the devices (e.g., modules or functions thereof) or methods (e.g., operations) according to the various embodiments of the present disclosure may be implemented as, for example, an instruction stored in a computer readable storage medium in the form of a programming module. When the command is executed by one or more processors (for example, the processor 1410), the one or more processors may execute a function corresponding to the command. The computer-readable storage medium may be, for example, the memory 1430. At least a part of the programming module may, for example, be implemented (e.g., executed) by the processor 210. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

The embodiments of the present disclosure disclosed in the specification and the drawings are only particular examples proposed in order to easily describe the technical matters of the present disclosure and help with comprehension of the present disclosure, and do not limit the scope of the present disclosure. Therefore, in addition to the embodiments disclosed herein, the scope of the various embodiments of the present disclosure should be construed to include all modifications or modified forms drawn based on the technical idea of the various embodiments of the present disclosure.

The invention claimed is:

1. An accessory device for a portable electronic device, the accessory device comprising:
 a first cover that is detachably attached to at least a portion of the electronic device;
 a second cover that is connected to the first cover, at least a portion of the second cover covering at least a portion of a display of the electronic device; and
 an electronic circuit arranged inside the first cover or the second cover and having a memory that stores at least some codes or data that indicate one or more of identification information, a characteristic, a configuration, a structure, and a function that are associated with a protection cover,
 wherein the at least some codes or data is transmitted to the portable electronic device when the accessory device is detected by the portable electronic device, and
 wherein the at least some of the codes or data indicate at least one of a position, and a size of a window or an opening that is included in the accessory device.

2. The accessory device of claim 1, wherein the first cover includes a coupling portion that is detachably attached to the electronic device, and the coupling portion includes one or more magnetic elements.

3. The accessory device of claim 1, wherein the first cover is configured to cover substantially the whole of a face of the electronic device which is opposite to a face that includes the display.

4. The accessory device of claim 1, wherein the at least some of the codes or data further indicates at least one of software version information, a manufacturing date, a manufacturer, a color, a kind, an input/output function, and an associated function of the accessory device.

5. A portable electronic device comprising:
 a main body;
 a display that is exposed through one face of the main body;
 at least one sensor configured to detect whether a portion of an accessory device, which is detachably attached to at least a portion of the main body, is adjacent to at least a portion of the display; and
 a processor that is included inside the main body, and is electrically connected to the display and the sensor,
 wherein the processor is configured to:
  receive data and/or codes from an electronic circuit that is embedded in the accessory device in response to the detection of the accessory device by the at least one sensor, and
  control at least one of a screen that is displayed on the display and a function of the portable electronic device, at least partially based on the received data and/or codes, and
  wherein the at least some of the codes or data indicate at least one of a position and a size of a window or an opening that is included in the accessory device.

6. The portable electronic device of claim 5, wherein the sensor is a Hall sensor configured to detect at least one magnetic element that is arranged in the accessory device, or a proximity sensor or an image sensor configured to detect whether a portion of the accessory device is adjacent to at least a portion of the display.

7. The portable electronic device of claim 5, wherein the at least some of the codes or data further indicates at least one of software version information, a manufacturing date, a manufacturer, a color, a kind, an input/output function, and an associated function of the accessory device.

8. A method of operating of a portable electronic device that includes an accessory device installed to cover at least a portion of a display, the method comprising:
 detecting whether a portion of the accessory device is adjacent to at least a portion of the display;
 in response to the detection of the accessory device, receiving data and/or codes from an electronic circuit that is embedded in the accessory device; and
 controlling at least one of a screen that is displayed on the display and a function of the portable electronic device, at least partially based on the received data and/or codes,
 wherein the at least some of the codes or data indicate at least one of a position and a size of a window or an opening that is included in the accessory device.

9. The method of claim 8, further comprising:
 conducting a certification process with the accessory device, prior to the operation of receiving the data and/or codes.

10. The method of claim 9, wherein the conducting of the certification process includes:
 producing a first encoding result value by producing a random value and applying the random value to a preset encoding algorithm;
 transmitting the random value to the accessory device and receiving a second encoding result value from the accessory device; and
 comparing the first encoding result value and the second encoding result value with each other.

11. The method of claim 8, wherein the at least some of the codes or data further indicates at least one of software version information, a manufacturing date, a manufacturer, a color, a kind, an input/output function, and an associated function of the accessory device.

12. A portable electronic device comprising:
 a main body;
 a display that is exposed through one face of the main body;
 an accessory device that is detachably attached to at least a portion of the main body, at least a portion of the accessory device being arranged to be selectively adjacent to at least a portion of the display;
 at least one sensor configured to detect whether a portion of the accessory device is adjacent to at least a portion of the display; and
 a processor that is included inside the main body, and is electrically connected to the display and the sensor,
 wherein the processor is configured to:
  receive data and/or codes from an electronic circuit that is embedded in the accessory device in response to the detection of the accessory device by the at least one sensor, and control at least one of a screen that is displayed on the display and a function of the electronic device, at least partially based on the received data and/or codes, and wherein the at least some of the codes or data indicate at least one of a position and a size of a window or an opening that is included in the accessory device.

* * * * *